(12) United States Patent
Bahadur et al.

(10) Patent No.: US 7,940,695 B1
(45) Date of Patent: May 10, 2011

(54) FAILURE DETECTION FOR TUNNELED LABEL-SWITCHED PATHS

(75) Inventors: Nitin Bahadur, Santa Clara, CA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 491 days.

(21) Appl. No.: 11/848,780

(22) Filed: Aug. 31, 2007

Related U.S. Application Data

(60) Provisional application No. 60/942,911, filed on Jun. 8, 2007.

(51) Int. Cl.
*H04L 12/56* (2006.01)
(52) U.S. Cl. .................................... 370/254; 370/389
(58) Field of Classification Search .................. None
See application file for complete search history.

(56) References Cited

U.S. PATENT DOCUMENTS

| | | | |
|---|---|---|---|
| 6,862,288 B2 | 3/2005 | Sharma et al. | |
| 7,068,624 B1 | 6/2006 | Dantu et al. | |
| 7,463,591 B1 | 12/2008 | Kompella et al. | |
| 2001/0033574 A1* | 10/2001 | Enoki et al. | 370/396 |
| 2002/0004843 A1 | 1/2002 | Andersson et al. | |
| 2002/0030864 A1 | 3/2002 | Chaudhuri et al. | |
| 2002/0093954 A1 | 7/2002 | Weil et al. | |
| 2002/0176415 A1 | 11/2002 | Holden et al. | |
| 2003/0063560 A1* | 4/2003 | Jenq et al. | 370/216 |
| 2003/0112749 A1 | 6/2003 | Hassink et al. | |
| 2005/0281192 A1* | 12/2005 | Nadeau et al. | 370/217 |
| 2006/0095499 A1 | 5/2006 | Luciani et al. | |
| 2006/0198321 A1* | 9/2006 | Nadeau et al. | 370/254 |
| 2008/0080507 A1* | 4/2008 | Swallow et al. | 370/392 |
| 2009/0086644 A1 | 4/2009 | Kompella et al. | |

OTHER PUBLICATIONS

Kompella, K. et al. "Detecting Multi-Protocol Label Switched (MPLS) Data Plane Failures", Feb. 2006, Network Working Group, RFC 4379, pp. 1-51.*
K. Kompella et al., "Detecting Multi-Protocol Label Switched (MPLS) Data Plane Failures," *Request for Comments: 4379*, (The Internet Society, Feb. 2006), 43 pgs.
D. Awduche, et. al., "RSVP-TE: Extensions to RSVP for LSP Tunnels," *Request for Comments: 3209*, sections 4.6.1.1 and 4.6.2.1, (Internet Engineering Task Force, Dec. 2001), 52 pgs.
U.S. Appl. No. 10/179,927, entitled "Detecting Data Plane Liveliness in Connections Such As Label-Switched Paths", filed Jun. 25, 2002, to Ping Pan and Nischal Sheth.
U.S. Appl. No. 10/365,598, entitled "Detecting Data Plane Liveliness of a Label-Switched Path," filed Feb. 12, 2003 to Kireeti Kompella, Ping Pan and Nischal Sheth.
Kompella, K. et al., "Detecting Multi-Protocol Label Switched (MPLS) Data Plane Failures", Request for Comments: 4379, The Internet Society, Feb. 2006, 51 pp.

(Continued)

*Primary Examiner* — Chirag G Shah
*Assistant Examiner* — Steve Young
(74) *Attorney, Agent, or Firm* — Shumaker & Sieffert, P.A.

(57) ABSTRACT

In general, principles of the invention relate to techniques for detecting data plane failures in Multi-Protocol Label Switching (MPLS) Label-Switched Paths (LSPs) that may be tunneled over one or more other LSPs. More specifically, the techniques described herein allow for testing connectivity of an LSP that is tunneled through at least one other LSP, and testing connectivity of an inter-autonomous system LSP. For example, a method comprises providing, with an intermediate label-switching router (LSR) of an LSP, instructions to an ingress LSR of the LSP to modify a forwarding equivalence class (FEC) stack of MPLS echo request packets. The intermediate LSR may provide the instructions within an MPLS echo reply packet.

23 Claims, 14 Drawing Sheets

OTHER PUBLICATIONS

Awduche, D. et al., "RSVP-TE: Extensions to RSVP for LSP Tunnels", Request for Comments: 3209, Sections 4.6.1.1 and 4.6.2.1, Internet Engineering Task Force, Dec. 2001, 62 pp.

Office Action for U.S. Appl. No. 10/365,598, dated Jan. 25, 2008, 11 pp.

Response to Office Action for U.S. Appl. No. 10/365,598, dated Apr. 25, 2008, 18 pp.

Notice of Allowance for U.S. Appl. No. 10/365,598, dated Aug. 1, 2008, 6 pp.

Office Action for U.S. Appl. No. 12/329,708, dated Feb. 25, 2010, 12 pp.

Response to Office Action for U.S. Appl. No. 12/329,708, dated Jul. 26, 2010, 19 pp.

U.S. Appl. No. 11/848,780, filed Aug. 31, 2007 listing Nitin Bahadur and Kireeti Kompella as inventors.

* cited by examiner

FAILURE DETECTION FOR TUNNELED LABEL-SWITCHED PATHS

This application claims the benefit of U.S. Provisional Application No. 60/942,911, filed Jun. 8, 2007, the entire content of which is incorporated herein by reference.

TECHNICAL FIELD

The invention relates to computer networks and, more particularly, to detecting and diagnosing errors in computer network connections, such as multi-protocol label switching (MPLS) label-switched paths (LSPs).

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Label-switching can be used to establish a fixed path from a head-end node (e.g., an ingress router) to a tail-end node (e.g., an egress router). The fixed path may be determined using known protocols. Once a path is determined, each router in the path may be configured (manually, or via some signaling mechanism) to forward packets to a peer (e.g., a "downstream" or "upstream" neighbor) router in the path. Routers in the path determine that a given set of packets (e.g., a flow) are to be sent over the fixed path, as opposed to being routed individually, based on unique labels added to the packets.

Another use of label-switching is to create "tunnels" through a network by encapsulating packets within other packets, e.g., by pre-pending one or more additional headers to the original packet. Once the original packet is encapsulated and enters a tunnel, the tunneled packet is forwarded to the tunnel endpoints independent of the encapsulated packet's original headers. Typically, only the ingress router looks at the headers of the original packets and determines which subset of packets get sent into which tunnels. Intermediate (also referred to as "transit") routers use just the labels to forward the packet. This is useful in many applications, such as Virtual Private Networks (VPNs) or Layer 2 circuits. Such tunnels may be point-to-point, point-to-multipoint, multi-point-to-point, or multipoint-to-multipoint.

One type of tunnel is a label-switched path (LSP), which uses a technique by which labels are pre-pended to packets to control forwarding the packets along defined network paths. More specifically, the operation of forwarding a packet, based on address information, to a next hop can be thought of as two steps—partitioning the entire set of possible packets into a set of forwarding equivalence classes (FECs), and mapping each FEC to a next hop. As far as the forwarding decision is concerned, different packets which get mapped to the same FEC are indistinguishable. With multi-protocol label switching (MPLS), a particular packet is assigned to a particular FEC just once, as the packet enters the label-switched domain. The FEC to which the packet is assigned is encoded as a label, typically a short, fixed length value. Thus, at subsequent nodes, no further header analysis is conventionally employed—all subsequent forwarding over the label-switched domain is driven by the labels. Such FECs may be generalized such that particular ports, wavelengths, time slots, channels, etc. are used instead of, or encoded by, labels.

Unfortunately, forwarding information (such as an "OUT" label) of the forwarding component of label-switching routers (LSRs) may become corrupted. Consequently, data leaving such an LSR will be "black-holed" or mis-routed. When a next LSR in the LSP receives the packet with the wrong label, it will either discard it or transmit the packet along an LSP other than the desired LSP. Since the control plane of routers may use Internet protocol (IP) addresses to route its messages, the control plane will likely still be active and therefore might not recognize the error. Consequently, an ingress LSR may continue to transmit data through the non-functioning LSP.

SUMMARY

In general, principles of the invention relate to techniques for detecting failures (e.g., data plane failures) in Multiprotocol Label Switching (MPLS) Label-Switched Paths (LSPs). An LSP ping mechanism is described herein that includes mechanisms for detecting failure within LSPs. Moreover, techniques are described for extending the LSP mechanism for detecting failure even in environments in which one or more of the LSPs is tunneled over one or more other LSPs. In other words, the techniques described herein allow for testing connectivity of an LSP that is tunneled through another LSP. The techniques may also be applied for testing connectivity of an inter-autonomous system LSP.

One embodiment of the LSP ping mechanism for detecting data plane failures in MPLS LSPs is capable of operating in two modes: a ping mode for testing end-to-end connectivity of an LSP, and a traceroute mode for performing fault isolation. In the ping mode, an ingress LSR of an LSP tests connectivity to a remote host by sending an MPLS echo request packet to test the status of connectivity to the egress LSR of the LSP. If an MPLS echo reply packet is not received within a defined time period, connectivity to the egress LSR along the LSP is assumed to be down.

In the traceroute mode, the ingress LSR identifies a location of a fault in the LSP by tracing an MPLS echo request packet's path from the ingress LSR to the egress LSR. As output, the traceroute typically shows how many hops the packet traveled to reach the egress LSR, identifies each hop, and shows how long each hop took.

When an MPLS echo request is received, the receiver is expected to verify that the control plane and data plane are both healthy (for the FEC Stack being pinged) and that the two planes are in sync. The receiving device sends an MPLS echo reply indicating that the control plane and the data plane of the echo request are in sync, or an error message indicating that the control plane and the data plane of the echo request are not in sync.

Techniques are described for extending the LSP ping mechanism to support testing over tunneled LSPs and inter-autonomous system LSPs. The extensions to LSP ping allow label-switching routers (LSRs) to respond to multi-protocol label switching (MPLS) echo requests with additional information relating to an LSP tunnel. The additional information may include instructions (e.g., data or information) that allows the ingress LSR of the LSP being tested to modify a forwarding equivalence class (FEC) stack sent with subsequent MPLS echo requests. For example, the instructions may include instructions to add additional FEC information, swap FEC information, or remove FEC information from the FEC stack when sending subsequent MPLS echo requests in ping or traceroute mode.

The instructions allow an intermediate or egress LSR to manipulate the FEC information included within the MPLS echo requests created by the ingress LSR based on the otherwise unknown downstream topology of the LSP being tested. In this manner, an ingress LSR may use the LSP ping mechanism to locate a network connectivity error in an LSP even when the ingress LSR is unaware that the LSP is at some point tunneled through one or more other LSPs, or that the LSP is stitched to another LSP in a separate autonomous system.

In one embodiment, a system comprises an ingress label-switching router (LSR) of a first label-switched path (LSP) and an intermediate LSR of the first LSP. The ingress LSR of the first LSP tests connectivity of the first LSP by sending a Multi-Protocol Label Switching (MPLS) echo request packet that includes a forwarding equivalence class (FEC) stack having a FEC identifying the first LSP. Upon receiving the MPLS echo request packet, the intermediate LSR sends an MPLS echo reply packet to the ingress LSR that instructs the ingress LSR to modify the FEC stack of subsequent MPLS echo request packets.

In yet another embodiment, a method comprises providing, with an intermediate LSR of a LSP, instructions to an ingress LSR of the LSP to modify a FEC stack of Multi-Protocol Label Switching (MPLS) echo request packets.

In a further embodiment, a method comprises testing connectivity of a LSP that is tunneled through at least one other LSP using LSP ping executing on a LSR.

In a further embodiment, a method comprises testing connectivity of an LSP that is stitched to at least one other LSP using LSP ping executing on an LSR.

In yet another embodiment, a method comprises, with an ingress label-switching router (LSR) of a first label-switched path (LSP), sending a Multi-Protocol Label Switching (MPLS) echo request packet that includes a forwarding equivalence class (FEC) stack having a FEC identifying the first LSP, receiving the MPLS echo request packet with an intermediate LSR of the first LSP, and with the intermediate LSR, sending an MPLS echo reply packet to the ingress LSR that instructs the ingress LSR to modify the FEC stack of subsequent MPLS echo request packets.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
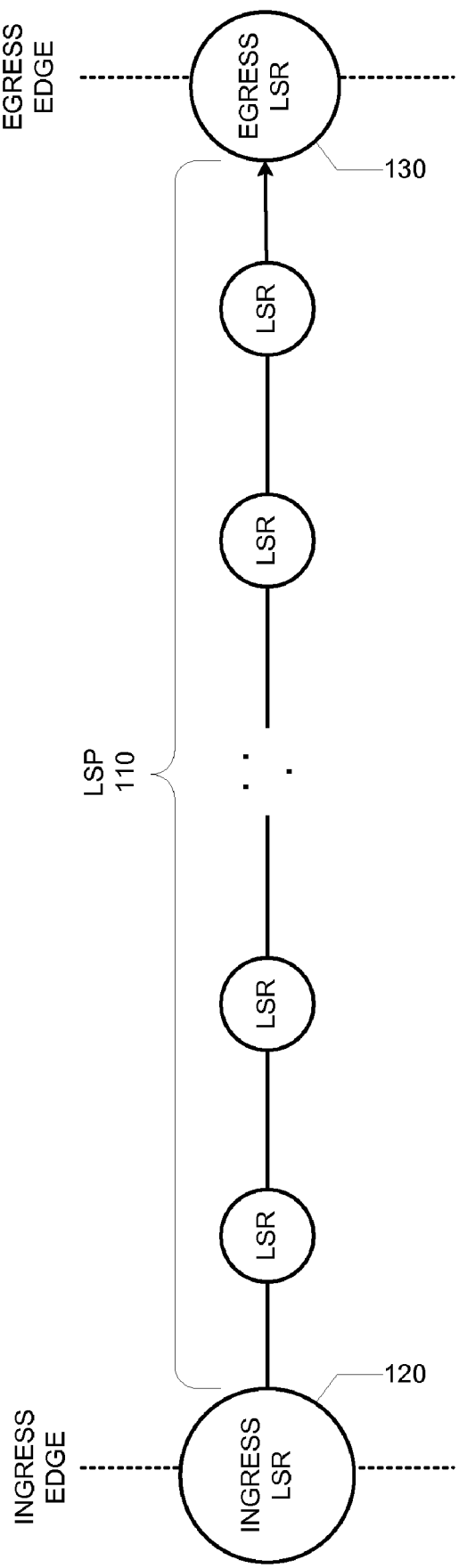
FIG. 1 illustrates an LSP including an ingress LSR, transit LSRs, and an egress LSR.

FIG. 1 illustrates an LSP 110 across a network. Notice that the paths making up LSP 110 are simplex—traffic flows in one direction from one or more ingress LSRs, such as LSR 120 at an ingress edge, to one or more egress LSRs, such as LSR 130 at an egress edge. Generally, duplex traffic requires two LSPs—one for each direction. However, some protocols support bi-directional LSPs. An LSP may be defined by the concatenation of one or more label-switched hops, allowing a packet to be forwarded from one LSR to another across the MPLS domain defined by LSP 110.

Figure 2:
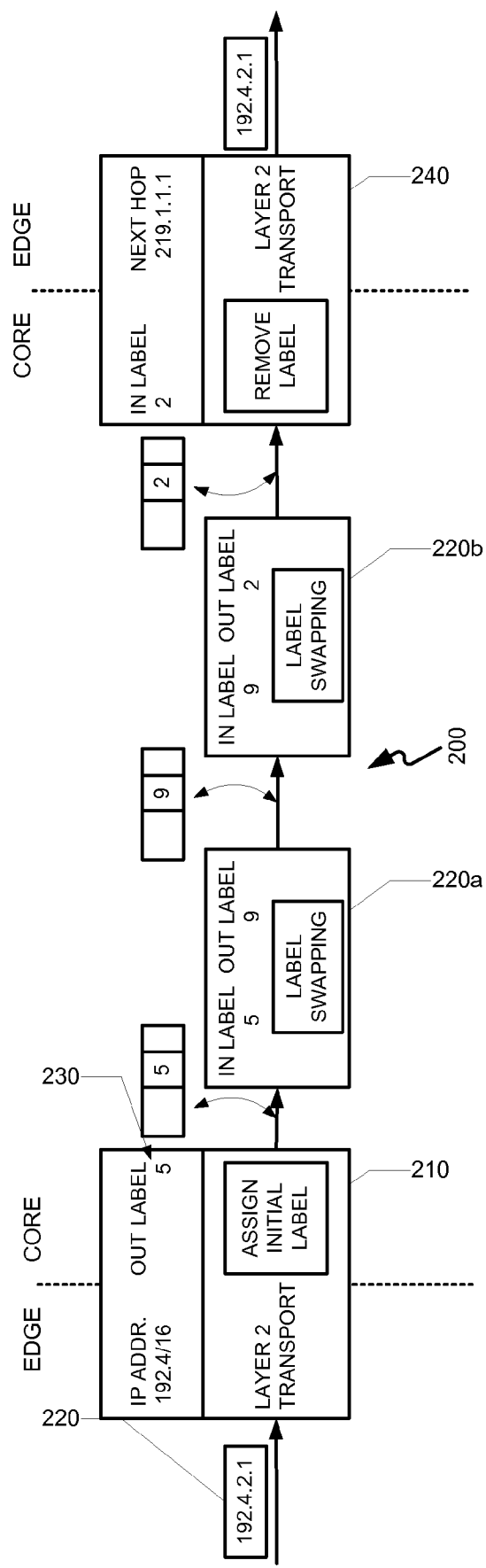
FIG. 2 illustrates label assignment, switching and popping by LSRs of an LSP.

FIG. 2 illustrates an example operation of an LSP in further detail. As shown, labels are assigned to packet traversing the LSP; each label may be a short, fixed-length value which may be carried in the packet's header and identify a FEC. Recall further that a FEC is a set of packets that are forwarded over the same path through a network, sometimes even if their ultimate destinations are different. At the ingress edge of the network, each packet may be assigned an initial label (e.g., based on all or a part of its layer 3 destination address). More specifically, in the example illustrated in FIG. 2, an ingress LSR 210 interprets a destination address 220 of an unlabeled packet, performs a longest-match routing table lookup, maps the packet to an FEC, assigns a label 230 to the packet based on the FEC, and forwards it to the next hop in the LSP. More generally, FEC classification may be based on the input port, input interface, various fields of the layer 2 header, various fields of the layer 3 header, or some combination of these.

In the MPLS domain, LSRs 220 ignore the packet's network layer header and simply forward the packet using label-swapping. More specifically, when a labeled packet arrives at an LSR, the input port number and the label are used as lookup keys into an MPLS forwarding table. When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the LSP. FIG. 2 illustrates such label-switching by LSRs 220*a* and 220*b*.

When the labeled packet arrives at egress LSR 240, if the next hop is not an LSR, egress LSR 240 discards (pops) the label and forwards the packet. This forwarding may be determined by the label received by egress LSR 240, or it may be based on conventional (e.g., longest-match IP) forwarding. Alternatively, label popping can be performed by the penultimate router of the LSP.

In the example illustrated in FIG. 2, each LSR had appropriate forwarding labels. These labels may be provided to the LSR in several ways.

There are two basic types of LSPs—static LSPs and protocol (e.g., label distribution protocol (LDP), resource reservation protocol (RSVP), border gateway protocol (BGP)) signaled LSPs. Although each type of LSP is known to those skilled in the art, each is introduced below for the reader's convenience.

With static LSPs, labels are assigned manually, by means of provisioning tools on all LSRs involved in the LSP, or some combination of these. No signaling operations by the nodes are needed.

With RSVP signaled LSPs, an ingress LSR is configured. The ingress LSR uses configuration information to determine the path (e.g., explicit path, path constraint, or both). The egress and transit LSRs accept signaling information from the ingress LSR. Therefore, the LSRs of the LSP set up and maintain the LSP cooperatively through the use of path signaling messages such as PATH messages and RESV messages.

PATH messages are sent from the ingress LSR to the egress LSR and follow the path of the LSP. RESV messages originate from the egress LSR, and are delivered hop-by-hop back towards the ingress LSR. As a PATH message travels the path of an LSP, it takes the IP address of the LSR it was transmitted from and stores it in the LSR to which it is sent. This "IP trail" left by the PATH message is used by RESV messages to return back through the LSP path. Any errors encountered when establishing and maintaining an LSP are reported back to the ingress LSR.

Signaling of LSPs via Constraint-based Routed Label Distribution Protocol (CR-LDP) is very similar to signaling via RSVP, both in the configuration of the LSPs and the operation of the protocol.

With LDP-signaled LSPs, LSRs establish LSPs through a network by mapping network-layer routing information directly to data link layer-switched paths. LDP operates in a hop-by-hop fashion as opposed to RSVP's end-to-end fashion. More specifically, LDP associates a set of destinations (route prefixes and router addresses) with each data link LSP. This set of destinations are considered a FEC. These destinations all share a common data link layer-switched path egress and a common unicast routing path. Each router chooses the label advertised (e.g., in a label mapping message) by the next hop for the FEC and splices it to the label it advertises to all other LSRs. This forms a tree of LSPs that converge on the egress LSR.

BGP may be used to signal a label associated with an interior gateway protocol-version 4 ("IGPv4"), or IGPv6 prefix. Such a prefix may be carried in a BGP network layer reachability information (NLRI) message used to exchange labels (e.g., for VPNs). For example, consider an LSP between node 1 and node 2 in autonomous system (AS) 1, and an LSP between node 3 and node 4 in AS 2. The two LSPs could be "stitched together" across the two ASs using a BGP session between node 2 and node 3.

An LSP may be considered to have two planes, a control plane and a data plane. In an RSVP-signaled LSP, the PATH and RESV messages that are used to set up and maintain the LSP are transmitted on the control plane using IP addresses, and user traffic is transmitted on the data plane using labels. Similarly, in an LDP-signaled LSP, the label mapping messages that are used to set up the LSP are transmitted on the control plane using IP addresses, and user traffic is transmitted on the data plane using labels. Finally, in a BGP-signaled LSP, network layer reachability information ("NLRI") messages are transmitted on the control plane using IP addresses and user traffic is transmitted on the data plane using labels. In some cases, the control plane and the data plane run over physically or logically separate networks.

To test that packets that belong to a particular FEC actually end up on an egress LSR for the LSP associated with that FEC, the techniques described herein may use an MPLS connectivity request message carrying information about the FEC whose LSP is being verified. In one embodiment, this connectivity request message is forwarded just like any other packet belonging to the FEC. The present invention may support two test modes: basic connectivity checks, as well as fault isolation. In a "ping" (basic connectivity test) mode, the packet should reach the end of the path, at which point the packet is sent to the control plane of the egress LSR. The egress LSR then verifies that it is indeed an egress for the LSP and sends an MPLS echo reply packet indicating the functional connectivity of the LSP. In a "trace_route" (fault isolation test) mode, the packet is sent to the control plane of each transit LSR, which performs various checks that it is indeed a transit LSR for the LSP. The transit LSR may also return further information that helps check the control plane against the data plane, i.e., that forwarding data structures and operation match what the routing protocols determined as the path.

In one embodiment, the connectivity of an LSP is tested periodically. Alternatively, the connectivity is tested in response to user initiation or some other event. If the connectivity test fails, a fault isolation test of the LSP can then be initiated to determine where the fault lies. Alternatively, fault isolation tests of an LSP may be performed periodically to verify that forwarding matches the control plane.

An MPLS echo request is used to test a particular LSP. The LSP to be tested is identified by the "FEC Stack"; for example, if the LSP was set up via LDP, and is to an egress IP address of 10.1.1.1, the FEC Stack contains a single element, namely, an LDP IPv4 prefix sub-TLV with value 10.1.1.1/32. If the LSP being tested is an RSVP LSP, the FEC Stack may consist of a single element that captures the RSVP Session and Sender Template that uniquely identifies the LSP.

According to the techniques described herein, depending on the topology of the network, the FEC Stacks used by the ingress router can be more complex. For example, one may wish to test a VPN IPv4 prefix of 10.1/8 that is tunneled over an LDP LSP with egress 10.10.1.1. The FEC Stack would then contain two sub-TLVs, the bottom being a VPN IPv4 prefix, and the top being an LDP IPv4 prefix. If the underlying (LDP) tunnel were not known, or was considered irrelevant, the FEC Stack could be a single element with just the VPN IPv4 sub-TLV.

Figure 3:
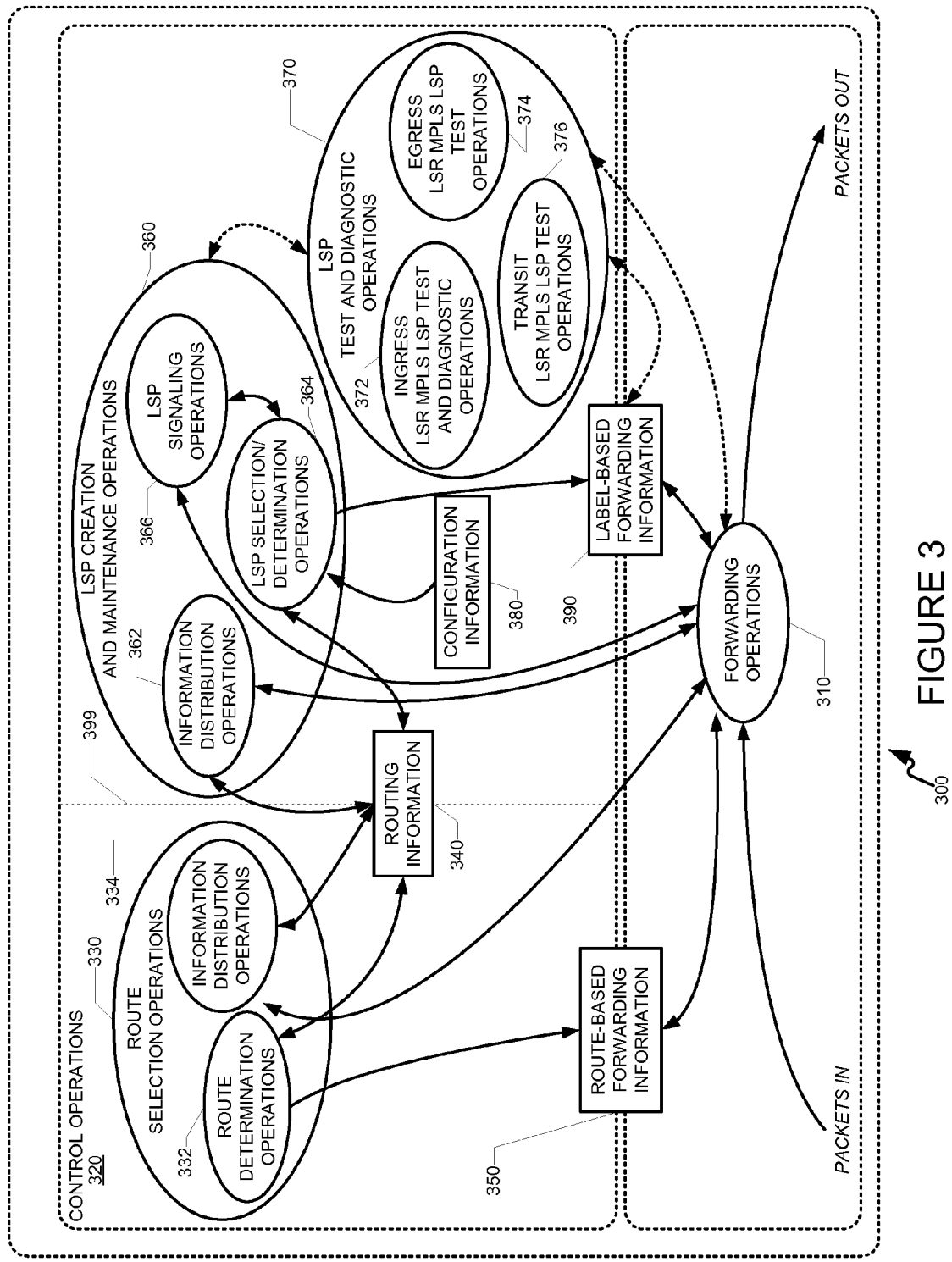
FIG. 3 is a bubble chart (state diagram) of a router which may operate in a manner consistent with principles of the present invention.

In any case, when an MPLS echo request is received, the receiver is expected to verify that the control plane and data plane are both healthy (for the FEC Stack being pinged) and that the two planes are in sync. If so, the receiver may send an MPLS echo reply packet indicating the functional connectivity of the LSP FIG. 3 is a bubble chart (state diagram) of a router 300 which may operate in a manner consistent with principles of the present invention. In this example, router 300 may include a packet forwarding operations 310 (part of a "data plane") and control (e.g., routing) operations 320 (part of a "control plane"). Packet forwarding operations 310 may forward received packets based on route-based forwarding information 350 or based on label-based forwarding information 390, such as LSP information.

Regarding control operations 320, the operations and information depicted to the right of dashed line 399 are related to creating and maintaining virtual links, such as LSPs, while the operations and information depicted to the left of dashed line 399 are related to creating routes. These operations and information needn't be performed and provided, respectively, on all routers of a network.

The route selection operations 330 include information distribution operations 334 and route determination operations 332. Information distribution operations 334 may be used to discover network topology information, store it as routing information 340, and distribute such information. Route determination operations 332 may use routing information 340 to generate route-based forwarding information 350.

The LSP creation and maintenance operations 360 (e.g., RSVP, LDP, BGP, etc.) may include an information distribution operations 362, LSP selection/determination operations 364, and LSP signaling operations 366. Information distribution operations 362 may be used to obtain information about the network, store such information as LSP information (not shown), and distribute such information. LSP determination/selection operations 364 may use routing information 340, the LSP information, configuration information 380, or some combination of these, to generate label-based forwarding information 390, such as LSPs. LSP signaling operations 366 may be used to accept and disseminate label-based forwarding information.

Consistent with principles of the invention, exemplary router 300 may also include (e.g., MPLS) LSP test and diagnostic operations 370. Test and diagnostic operations 370 may include ingress LSR (e.g., MPLS) LSP test and diagnostic operations 372, egress LSR (e.g., MPLS) LSP test operations 374, and/or transit LSR (e.g., MPLS) LSP test operations 376. Ingress LSR MPLS LSP test and diagnostic operations 372 may use label-based forwarding information 390 to test (e.g., suspect) LSPs, if router 300 is the ingress LSR of the (suspect) LSP to be tested. Egress LSR MPLS LSP test operations 374 may use label-based forwarding information 390 and may also use LSP signaling operations 366 or route-based forwarding information 350 to respond to requests (e.g., from an ingress LSR) in a reliable manner. Similarly, the transit LSR MPLS LSP test operations 376 may use label-based forwarding information 490 to forward requests, and may use LSP signaling operations 366 or route-based forwarding information 350 to respond to certain (e.g., fault isolation) requests from the ingress LSR, in a reliable manner. As will be appreciated by those skilled in the art, various nodes or LSRs do not need to support all of these LSP tests and diagnostic operations 370. Further interactions between these operations as they pertain to the invention are described below.

The principles of the invention may be used to detect data plane failures in LSPs. To this end, the principles of the invention may (i) specify information carried in an LSP connectivity or fault isolation request and connectivity or fault isolation reply messages; and (ii) specify the transport of the connectivity or fault isolation reply back to the requesting node (e.g., the ingress LSR). The LSP connectivity or fault isolation request and reply messages provide information to check correct operation of the data plane, as well as a mechanism to verify the data plane against the control plane, and thereby localize faults. The transport of the connectivity or fault isolation reply back to the requesting node may use a reliable reply channel for more robust fault isolation.

Before performing the diagnostic operation, it should be determined if both ingress and egress LSRs support the diagnostic operation. Such a check is not mandatory, but would prevent false negatives.

In addition, to protect against Denial of Service (DoS) attacks, the request should be encapsulated in a protocol that offers flow control mechanisms. For example, a rate limiter could be applied to the well-know user datagram protocol (UDP) port. This limits the damage that may be caused if an LSR is flooded with packets carrying echo requests, which is typical in a DoS attack.

The principles of the invention may be used to ensure that packets belonging to a particular LSP actually end up on an egress LSR for that LSP. In FIG. 3, the ingress LSR MPLS LSP diagnostic operations 372 may be used to generate an MPLS test node request that carries information about the LSP being verified. Such a request could be generated by some node other than the ingress LSR of the LSP being tested. For example, an echo request could be used. This echo request is forwarded just like any other packet belonging to the FEC associated with the LSP. The request may specify a mode of the diagnosis—either end-to-end (dubbed a "ping" or connectivity mode), or to check each segment of the LSP (dubbed a "trace_route" or fault isolation mode).

In the ping (connectivity test) mode, the packet should reach an egress LSR of the LSP. Here, the egress LSR sends the relevant information to its control plane (to its egress LSR MPLS LSP diagnostic operations 374) which (i) determines whether or not it is indeed an egress for the LSP being tested, and (ii) returns a reply to the ingress LSR via a path or mechanism presumed to be reliable.

In trace_route (fault isolation test) mode, each transit LSR sends the relevant information to its control plane (to its transit LSR MPLS LSP diagnostic operations 376) which (i) determines whether or not it is indeed a transit LSR for the LSP being tested, and (ii) returns further information that helps check the control plane against the data plane (i.e., that forwarding matches what the protocols determined as the path).

One way these message modes can be used is to have ingress LSR MPLS LSP diagnostic operations 372 periodically test connectivity. If the connectivity test fails, ingress LSR MPLS LSP diagnostic operations 372 can then initiate a fault isolation test. Although ingress LSR MPLS LSP diagnostic operations 372 can also periodically run fault isolation tests to verify that forwarding matches the downstream router information returned earlier over the control plane, this places a greater burden on transit LSRs and should therefore be used judiciously.

Figure 4:
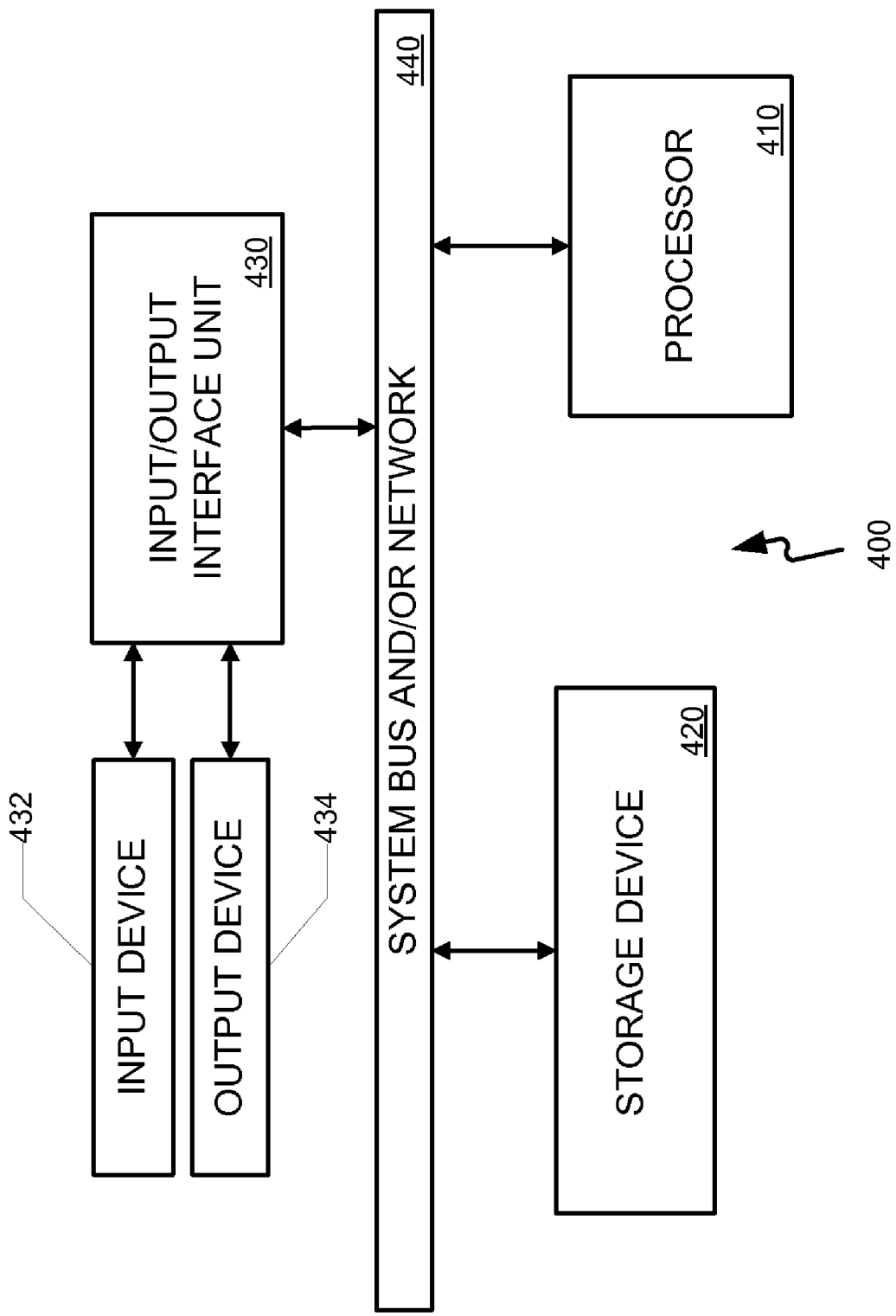
FIG. 4 is a block diagram of an apparatus that may be used to perform operations consistent with principles of the present invention.

FIG. 4 is high-level block diagram of a machine 400 (e.g., a network device) that may perform one or more of the operations discussed above. In this example, machine 400 includes a processor 410, an input/output interface unit 430 (which may include interface cards providing network interface ports), a storage device 420, and a system bus 440 for facilitating the communication of information among the coupled elements. An input device 432 and an output device 434 may be coupled with the input/output interface 430. Operations of the invention may be effected by the processor 410 executing instructions. The instructions may be stored in the storage device 420, received via the input/output interface 430, or both. The instructions may be functionally grouped into processing modules. Although not shown, more than one of some or all of these components may be provided.

Machine 400 may be a router, such as an LSR. In an exemplary LSR, processor 410 may include a microprocessor, a network processor, (e.g., custom) integrated circuits, or some combination of these and other elements. In the exemplary LSR, storage device 420 may include ROM, RAM, SDRAM, SRAM, SSRAM, DRAM, flash drive, hard disk drive, flash cards or some combination of these. At least some of these storage devices 420 may include program instructions defining an operating system, a protocol module (e.g., a daemon), and other modules. In one embodiment, methods consistent with the principles of the invention may be performed by a microprocessor executing stored program instructions (e.g., defining a part of the protocol module or daemon). At least a portion of the instructions may be stored temporarily or permanently on storage device 420, received from an external source via an input interface unit 430, or both. Finally, in the exemplary LSR, input/output interface unit 430, input device 432 and output device 434 may include interfaces to terminate communications links. Machine 400 may include a routing engine and a packet forwarding engine.

Operations consistent with the principles of the present invention may be performed on apparatus other than routers, and such devices may include functionality other than routing functionality. Such other apparatus may employ similar or different hardware and software.

Figure 5:
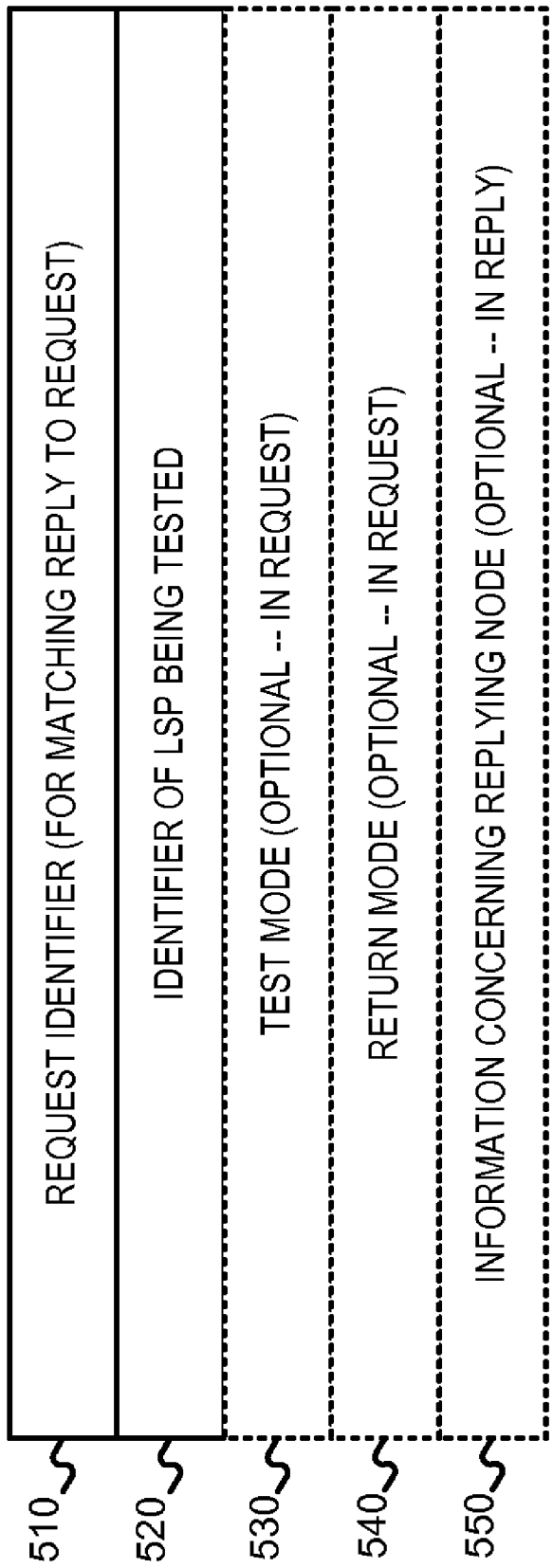
FIG. 5 is a diagram of exemplary information that should be provided in a request or reply related to testing an LSP in a manner consistent with principles of the present invention.

FIG. 5 illustrates a data structure of an object 500 that may be included in a request or a reply. Object 500 may include a request identifier 510 and an identifier 520 of the LSP (or FEC) being tested. Request identifier 510 may be used to match a received reply to a previously sent request, and should therefore be able to identify uniquely, at least locally at a given ingress LSR or some other node that initiated the test, a request. Accordingly, request identifier 510 may include one or more of: (i) an identifier of a process used to generate the request (and a sequence number or time stamp if a given process generates multiple requests); (ii) a time stamp; and (iii) an ingress LSR global identifier (e.g., a layer 3 (e.g., IP) address). Identifier 520 of the LSP (or FEC) being tested may be a FEC stack. The FEC stack may include, for example, an IP (e.g., version 4 or 6) prefix, an RSVP IP (e.g., version 4 or 6) session, a CR-LDP LSP identifier, a VPN IP (e.g., version 4 or 6) prefix, some layer 2 VPN prefix, etc.

As shown, object 500 may include additional information, such as a test mode 530, a return mode 540, and information 550 concerning a replying node. Test mode 530 may be carried in the object of the request and may specify one of a number of tests (e.g., connectivity or fault isolation) to be performed. Return mode 540 may be carried in the object of the request and may specify how the reply is to be returned to the ingress LSR or some other node that initiated the test. That is, return mode 540 may be used to specify a return channel such as routed path, routed path with router alert, control plane, etc., presumed to be reliable. Finally, information 550 concerning the replying node may be carried in an object of the reply and may be used to relay information about the node that generated the reply in response to the request.

Figure 6:
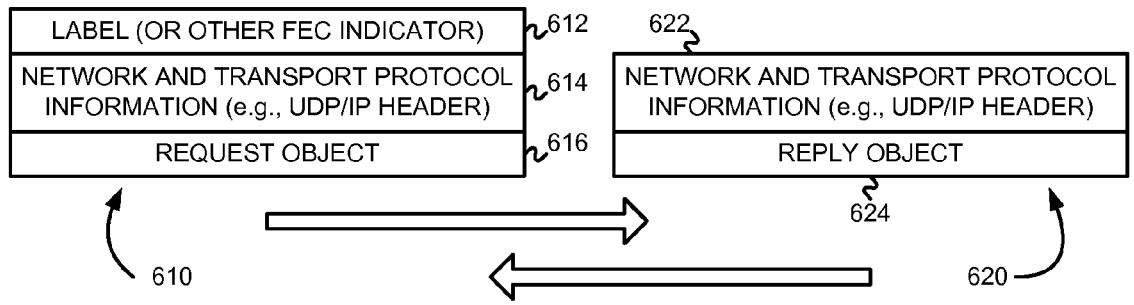
FIG. 6 is a block diagram illustrating a request object provided with header information and a label, and a reply object provided with header information in a manner consistent with principles of the present invention.

FIG. 6 illustrates exemplary request and reply messages. A request message 610 may include a request object 616 (such as 500, described above), network and transport layer protocol information (such as a UDP header and an IP header) 614, and a label or other information for identifying a FEC 612 for forwarding information 614/616 over an LSP being tested. A reply message 620 may include a reply object 624 (such as 500, described above), and network and transport layer protocol information 622, such as a UDP header and an IP header.

Figure 7:
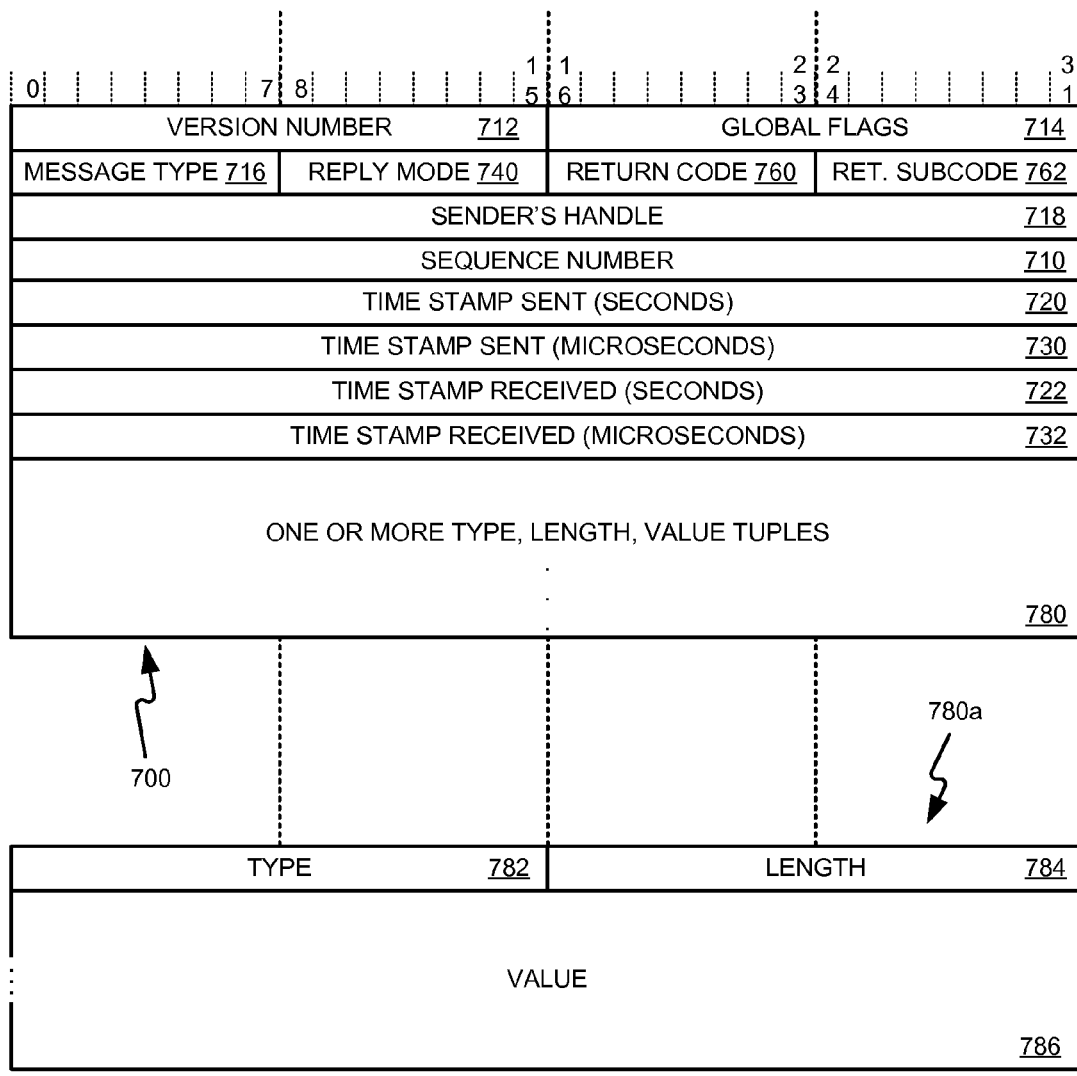
FIG. 7 is a block diagram illustrating an exemplary data structure that may be used as a request and/or reply object in a manner consistent with principles of the present invention.

FIG. 7 illustrates a data structure of an exemplary object 700 that may be used as a request or reply object 616/624 in a manner consistent with principles of the invention. Object 700 may include a field 710 for carrying a sequence number, field 712 for carrying a version number, field 714 for carrying one or more global flags, field 716 for carrying a sender's handle, fields 720, 722, 730, and 732 for carrying time stamps in seconds, and microseconds, a field 740 for carrying a reply mode, a field 760 for carrying a return code, and one or more TLV tuples 780.

The version number carried in field 712 may be sixteen bits and may be set according to the version of the protocol being used. For example, initially, the version number of field 712 may be set to "1." The version number may be changed, e.g. incremented, when a change occurs that affects the ability of an implementation to correctly parse or process an MPLS echo request or reply. Such changes may include, for example, syntactic or semantic changes made to any of the fixed fields, or to any Type-Length-Value (TLV), e.g. the value(s) of field 780, or a sub-TLV assignment or format that is defined at a certain version number. In one embodiment, the version number may change in response to an optional TLV or sub-TLV addition.

Flag bits of the global flags carried in field 714 may be added or updated according to modifications to the protocol. Field 714 may be sixteen bits long such that, for example, each bit corresponds to one flag. For example, the sixteenth bit of field 714 may be defined as a validate FEC stack flag (V flag). In one embodiment, when the sender, e.g. of an echo request, wants the receiver to perform FEC stack validation, the sender may set the V flag to "1," whereas when the sender wants to leave the choice of whether to perform FEC stack validation to the receiver, the sender may set the V flag to "0." In one embodiment, undefined flags may be set to zero by the sender and ignored by the receiver.

The message type value, carried in field 716, may be eight bits and may indicate the type of message carried by packet 700. In one exemplary embodiment, the message type value of field 716 may take one of the following values:

| Value | Meaning |
| --- | --- |
| 1 | MPLS echo request |
| 2 | MPLS echo reply |

The sender of packet 700 may fill in the sender's handle value of field 718. Field 718 may be 32 bits. An echo reply packet may return an echo reply with the sender's handle value of field 718 unchanged. In one embodiment, a sender may use field 718 to match requests with replies.

The sequence number carried in field 710 may be 32 bits and may be assigned by the originator of the request. The sequence number serves to help match a reply to a request and can therefore be used, for example, to detect missed replies.

The time stamp carried in fields 720 and 730 may be set to the time of day (in seconds (32 bits) and microseconds (32 bits)) when an echo request is sent. Likewise, the time stamp carried in fields 722 and 732 may be set to the time of day (in seconds (32 bits) and microseconds (32 bits)) when an echo reply corresponding to the echo request is received. The time stamp of fields 722 and 732 may be set according to the receiver's clock. The time stamp may be used, for example, to compute delay or round trip time, to help match a reply to a request, or both. Timestamps in any or all of fields 720, 722, 730, and 732 may be formatted according to the Network Time Protocol (NTP) format.

The reply mode carried in field 740 may be used to specify a type of a presumed reliable return path. The reply mode may be eight bits and, in one exemplary embodiment, may take one of the following values:

| Value | Meaning |
| --- | --- |
| 1 | Do not reply |
| 2 | Reply via an IPv4/IPv6 UDP packet |
| 3 | Reply via an IPv4/IPv6 UDP packet with Router Alert |
| 4 | Reply via application level control channel |

In one exemplary embodiment, an MPLS echo request with "1" in field 740 may be used for one-way connectivity tests. A receiving router may log gaps in sequence numbers, i.e., the value of field 710 of various packets, and the receiving router may maintain delay or jitter statistics. A sender of an MPLS echo request may normally include a "2" in field 740 in one exemplary embodiment. A sender or sending router may determine, however, that a particular IP return path is unreliable; accordingly, the router may include a "3" in field 740 of a packet. In one embodiment, all intermediate routers include appropriate instructions as to how to forward echo replies when field 710 includes value "3." Moreover, when an application supports, for example, an IP control channel, and the sender wishes to use the supported control channel, the sender may include a "4" in field 740, which may ensure that replies use the same channel.

The return code carried in field 760 may be eight bits. In one embodiment, the sender may set the return code to zero. In one embodiment, the receiver/replier to an echo request may set the return code in an echo response to one of the following values:

| Value | Meaning |
| --- | --- |
| 0 | No return code |
| 1 | Malformed echo request received |
| 2 | One or more of the TLVs was not understood |
| 3 | Replying router is an egress for the FEC at stack-depth <RSC> |
| 4 | Replying router has no mapping for the FEC at stack-depth <RSC> |
| 5 | Downstream mapping mismatch |
| 6 | Upstream interface index unknown |
| 7 | Reserved |
| 8 | Label switched at stack-depth <RSC> |
| 9 | Label switched, no MPLS forwarding at stack-depth <RSC> |

-continued

| Value | Meaning |
| --- | --- |
| 10 | Mapping for this FEC is not the given label at stack-depth <RSC> |
| 11 | No label entry at stack-depth <RSC> |
| 12 | Protocol not associated with interface at FEC stack-depth <RSC> |
| 13 | Premature termination of ping due to label stack shrinking to a single label |

In the above example embodiment, the notation <RSC> indicates that the return code may also have indicated a return subcode in field 762, which may be eight bits in length. Moreover, in the example embodiment, any return code value that does not include an <RSC> may require that the receiver set field 762 to value "0." Otherwise, the return subcode of field 762 should be filled in with the stack-depth for those codes that specify a stack-depth, e.g. values 3, 4, 8, 9, 10, 11, and 12 of field 760. Moreover, the return subcode of field 762 may contain the point in the label stack where processing was terminated. For example, when the return subcode of field 762 is "0," a router may determine that no labels were processed. Otherwise, the packet may have been label switched at a depth corresponding to the value of field 762. For example, if the value of field 762 is "6," a router may determine that six labels were processed.

The TLV tuples 780 may have a 16-bit type field 782, a 16-bit length field 784, and a value 786. Exemplary types, with respect to top-level TLVs for LSP ping, are defined below:

| Type # | Value Field |
| --- | --- |
| 1 | Target FEC Stack |
| 2 | Downstream Mapping |
| 3 | Pad |
| 4 | Not assigned |
| 5 | Vendor Enterprise Number |
| 6 | Not assigned |
| 7 | Interface and Label Stack |
| 8 | Not assigned |
| 9 | Errored TLVs |
| 10 | Reply TOS byte |

In one embodiment, types less than value "32768," i.e. types wherein the high-order bit is equal to "0," may be mandatory TLVs that must either be supported by an implementation or result in the return code of "2," i.e. the value "2" in field 760, being sent in an echo response. Types greater than or equal to "32768," i.e. types wherein the high-order bit is equal to "1," may be optional TLVs that should be ignored when the implementation does not support the TLV. Certain values, e.g. type 4, of field 782 may be "not assigned," which may allow room for the protocol to grow, as future embodiments may define meanings for "not assigned" values.

Length field 784 may be the length of value field 786 in octets. Value field 786 depends on the type and is preferably zero padded to align to a four-octet boundary. In one embodiment, TLVs may be nested within other TLVs; a nested TLV may be referred to as a "sub-TLV." In one embodiment, sub-TLVs are type-independent from the parent TLV. In one embodiment, sub-TLVs are 4-octet aligned. That is, when a sub-TLV is not four octets in length, the sub-TLV may be padded with zeros to fill four full octets. Exemplary target FEC stack TLVs and downstream mapping TLVs are described below.

In one exemplary embodiment, a target FEC stack is a list of sub-TLVs. The number of elements is determined by looking at the sub-TLV length fields. Target FEC stack sub-TLVs may include the following:

| Type # | Length | Value Field |
|---|---|---|
| 1 | 5 | LDP IPv4 prefix |
| 2 | 17 | LDP IPv6 prefix |
| 3 | 16 | RSVP IPv4 LSP |
| 4 | 52 | RSVP IPv6 LSP |
| 5 |  | Not assigned |
| 6 | 13 | VPN IPv4 prefix |
| 7 | 25 | VPN IPv4 prefix |
| 8 | 14 | L2 VPN endpoint |
| 9 | 10 | "FEC 128" Pseudowire (deprecated) |
| 10 | 14 | "FEC 128" Pseudowire |
| 11 | 16+ | "FEC 129" Pseudowire |
| 12 | 5 | BGP labeled IPv4 prefix |
| 13 | 17 | BGP labeled IPv6 prefix |
| 14 | 5 | Generic IPv4 prefix |
| 15 | 17 | Generic IPv6 prefix |
| 16 | 4 | Nil FEC |

Other FEC stack types may be defined as needed. Note that this TLV defines a stack of FECs in which the first FEC element corresponds to the top of the label stack, etc. It may be assumed that the stack consists of just one element. Some of the exemplary FEC stack types are now described.

In the exemplary IPv4 Prefix FEC stack type, the value consists of four octets of an IPv4 prefix followed by one octet of prefix length in bits. The IPv4 prefix is in network byte order. In the exemplary IPv6 Prefix FEC stack type, the value consists of sixteen octets of an IPv6 prefix followed by one octet of prefix length in bits. The IPv6 prefix is in network byte order.

In one embodiment, an MPLS echo must include a target FEC stack that describes the FEC stack being tested. As an example, an LSR "X" may have an LDP mapping for IP address 192.168.1.1. To further the example, the label for 192.168.1.1 may be "1001." To verify that label 1001 reaches an egress LSR that announced this prefix via LDP, X may send an MPLS echo request with an FEC stack TLV with one FEC in it, namely of type "1," i.e. LDP IPv4 prefix, with prefix "192.168.1.1/32" and X may send the echo request with a label of "1001."

Figure 8:
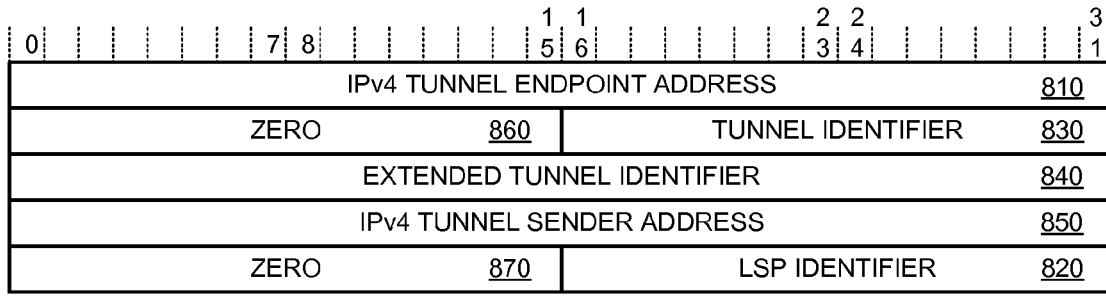
FIG. 8 is a block diagram illustrating an exemplary data structure that may be used as a resource reservation protocol (RSVP) IPv4 Session FEC stack type.

FIG. 8 illustrates an exemplary value 800 showing an RSVP IPv4 Session FEC stack type. As shown, value 800 may include a 32-bit IPv4 tunnel endpoint address field 810, a 16-bit LSP identifier field 820, a 16-bit LSP identifier field 830, a 32-bit extended tunnel identifier field 840 and a 32-bit IPv4 tunnel sender address 850. Value 800 may also include two 16-bit fields 860, 870 that are set to zero. The value fields, including zero fields 860, 870, are taken from the publication D. Awduche, et. al., "RSVP-TE: Extensions to RSVP for LSP Tunnels," *Request for Comments:* 3209, sections 4.6.1.1 and 4.6.2.1, (Internet Engineering Task Force, December 2001) (Hereafter referred to as "RFC 3209".)

Figure 9:
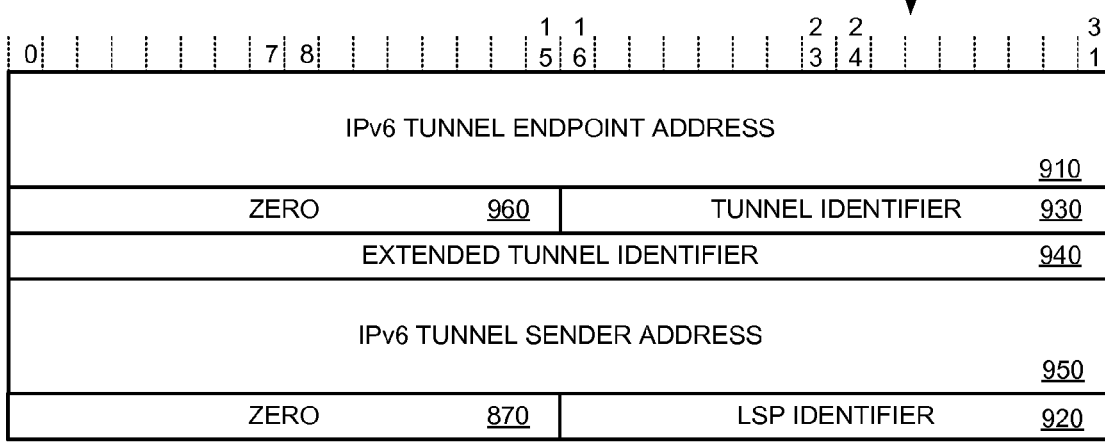
FIG. 9 is a block diagram illustrating an exemplary data structure that may be used as an RSVP IPv6 Session FEC stack type.

FIG. 9 illustrates an exemplary value 900 showing an RSVP IPv6 Session FEC stack type. As shown, value 900 may include a 128-bit IPv6, tunnel endpoint address field 910, a 16-bit LSP identifier field 920, a 16-bit LSP tunnel identifier field 930, a 32-bit extended tunnel identifier field 940 and a 128-bit IPv6, tunnel sender address 950. Value 900 may also include two 16-bit fields 960, 970 that are set to zero. The value fields, including zero fields 960, 970, are taken from sections 4.6.1.2 and 4.6.2.2 of RFC 3209. An exemplary value of a CR-LDP LSP ID FEC stack type (not shown) could consist of the LSP ID of the LSP being pinged. An LSP ID is a four octet IPv4 address (a local address on the head end LSR) plus a two octet identifier that is unique for each LSP that starts on an LSR.

Figure 10:
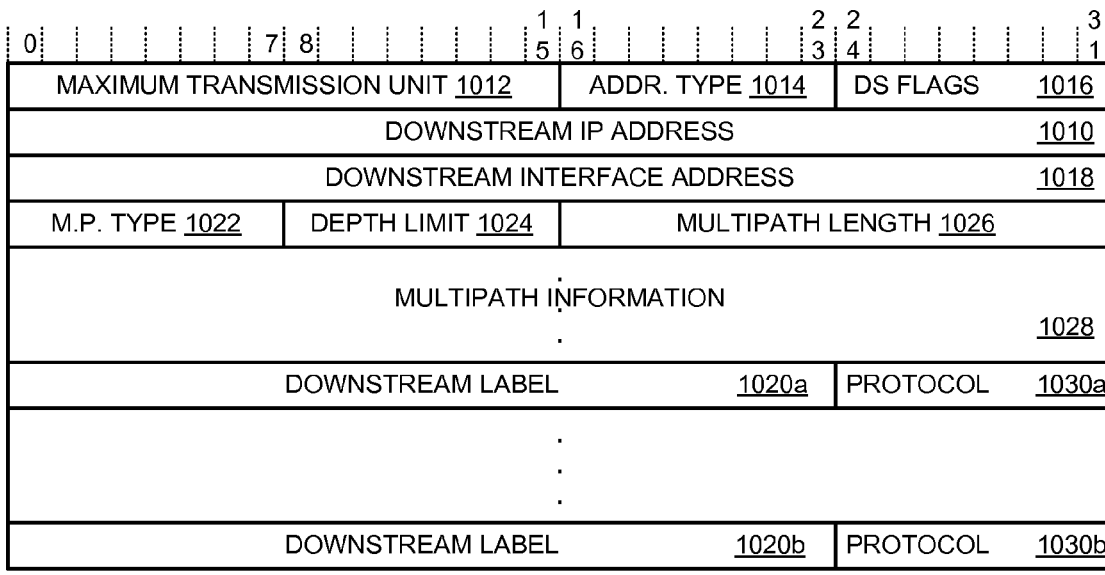
FIG. 10 is a block diagram illustrating an exemplary data structure that may be used as a downstream mapping type-length-value (TLV).

FIG. 10 illustrates an exemplary value 1000 showing a downstream mapping. A downstream mapping object, in one embodiment, is a TLV that may be included in an echo request message. In one embodiment, at most one downstream mapping object may appear in an echo request. The downstream mapping TLV is an optional TLV that may be carried in an echo request. The presence of a downstream mapping TLV may indicate a request for downstream mapping objects to be included in an echo reply. When the replying router is the destination of the FEC, in one embodiment, a downstream mapping TLV should not be included in the echo reply; otherwise, the replying router should include a downstream mapping object for each interface over which the FEC could be forwarded. The length of an exemplary downstream mapping TLV may be K+M+4*N, where M is the path length and N is the number of downstream labels. In one embodiment, values for K correspond to the value of address type of field 1014.

In the exemplary downstream mapping TLV illustrated in FIG. 10, the value 1000 may include a 16 bit maximum transmission unit (MTU) field 1012, an 8 bit address type field 1014, an 8 bit DS Flags field 1016, a downstream IP address field 1010, which may be four or sixteen octets (depending on the use of IPv4 or IPv6, as described below), a downstream interface address field 1018 (again depending on the use of either IPv4 or IPv6), which may be four or sixteen octets, an eight bit multipath type field 1022, an eight bit depth limit field 1024, a sixteen bit multipath length field 1026, a multipath information field 1028 of variable length, and one or more 24 bit downstream label field 1020, 8 bit protocol field 1030 pairs.

The value of field 1012 may indicate a maximum transmission unit (MTU). The value of the MTU may indicate the size, in octets, of the largest MPLS frame, including label stack, that may fit on the interface to the downstream LSR.

The value of field 1014 may indicate whether the interface is enumerated. Field 1014 may also indicate the length of the downstream IP address (i.e., the length of the value of field 1010) and the downstream interface address (i.e., the length of the value of field 1018). In one embodiment, the resulting total for the initial part of the TLV is listed as a "K Octet" value, as determined, for example, by the following table:

| Type #: | Address Type: | K Octets: |
|---|---|---|
| 1 | IPv4 Numbered | 16 |
| 2 | IPv4 Unnumbered | 16 |
| 3 | IPv6 Numbered | 40 |
| 4 | IPv6 Unnumbered | 28 |

The value of field 1016 may indicate settings for various flags. In one embodiment, each bit of the eight bit field 1016 corresponds to a different flag. Certain bits of field 1016 may not be used or may be reserved for future flag development. For example, in one embodiment, the first six bits may be reserved, while the seventh bit may be an I-flag and the eighth bit may be an N-flag. The I-flag may indicate that the replying router should include an interface and label stack object in the echo reply message. The N-flag may indicate that echo request messages will be used to diagnose non-IP flows. However, such messages may be carried by IP packets. As an example, a router that alters the ECMP algorithm based on the FEC or deep packet examination may treat a packet with the N-flag set as the router would treat a packet when the determination of the IP payload of the packet has failed.

Fields 1010 and 1018 indicate the values of a downstream IP address and a downstream interface address, respectively. IPv4 utilizes 32-bit addresses, i.e. IPv4 addresses may be encoded in 4 octets, so fields 1010 and 1018 are each four octets in length when used in conjunction with IPv4. On the other hand, IPv6 utilizes 128-bit addresses, thus fields 1010 and 1018 are each sixteen octets in length when used in conjunction with IPv6.

In one embodiment, the interface to the downstream LSR may be numbered. Accordingly, the value of field 1014, the address type, is set to either "1" (i.e., IPv4 Numbered) or "3" (i.e., IPv6 Numbered). Likewise, the downstream IP address (field 1010) may be set to either the downstream LSR's router ID or the interface address of the downstream LSR, and the downstream interface address (field 1018) may be set to the downstream LSR's interface address.

In another embodiment, the interface to the downstream LSR may be unnumbered. Accordingly, the value of field 1014, the address type, is set to either "2" (i.e., IPv4 Unnumbered) or "4" (i.e., IPv6 Unnumbered). Likewise, the downstream IP address (field 1010) may be set to the downstream LSR's router ID, and the downstream interface address (field 1018) may be set to an index, such as an interface index, assigned by the upstream LSR to the interface.

When an LSR does not have the IP address of the LSR's neighbor, the LSR may set the address type, i.e. field 1014, to either IPv4 unnumbered or IPv6 unnumbered, i.e. values "2" or "4" respectively. In one embodiment, the downstream IP address 1010 is set to "127.0.0.1" for IPv4. In one embodiment, the downstream IP address 1010 is set to "0::1" for IPv6. For either IPv4 or IPv6, the interface index, i.e. the value of field 1018, may be set to "0." When an LSR receives an echo request packet with either of these addresses in the downstream IP address field 1010, the LSR may bypass interface verification but continue with label validation.

Likewise, when the originator of an echo request packet wishes to obtain downstream mapping information, but does not have the expected label stack, then the originator may, in one embodiment, set the address type 1014 to either IPv4 unnumbered or IPv6 unnumbered. In one embodiment, the originator may set the downstream IP address field 1010 to an all-routers multicast address corresponding to the selected IP version. In IPv4, the all-routers multicast address is "224.0.0.2." Therefore, for IPv4, the originator may set the downstream IP address field 1010 to "224.0.0.2." In IPv6, the all-routers multicast address is "FF02::2." Therefore, for IPv6, the originator may set the downstream IP address field 1010 to "FF02::2." In either case, the interface index, i.e. the value of field 1018, may be set to "0." When an LSR receives an echo request packet with the all-routers multicast address (as indicated above), then the router may bypass both interface and label stack validation, but may also return downstream mapping TLVs using the information provided in the packet.

Field 1022 indicates a value for a multipath type. In one embodiment, field 1022 may take one of the following values:

| Key: | Type: | Multipath Information: |
|---|---|---|
| 0 | No multipath | Empty (MP length = 0) |
| 2 | IP address | IP addresses |
| 4 | IP address range | low/high address pairs |

-continued

| Key: | Type: | Multipath Information: |
|---|---|---|
| 8 | Bit-masked IP address set | IP address prefix and bit mask |
| 9 | Bit-masked label set | Label prefix and bit mask |

In the example embodiment described above, type "0" indicates that all packets will be forwarded out of this one interface. Types 2, 4, 8, and 9 specify that the supplied multipath information will serve to exercise this path.

Field 1024 indicates the value of a depth limit. In one embodiment, the depth limit may only apply to a label stack, and the limit may indicate the maximum number of labels considered in a hash. When unspecified or unlimited, the value of field 1024 may be set to "0."

Field 1026 may indicate the length of field 1028, i.e. the length of multipath information. The multipath information field 1028 may be variable in length, therefore field 1026 may be used to determine the length of field 1028. In one embodiment, field 1026 indicates the length of field 1028 in octets. Moreover, field 1028 may include multipath information, such as address or label values encoded according to multipath type.

Downstream label fields 1030 indicate the set of labels in the label stack as it would have appeared if this router were forwarding the packet through this interface. Any implicit null labels may also be included explicitly. Labels may be treated as numbers, e.g. labels may be right-justified in fields 1030. A downstream label may be 24 bits and in the same format as an MPLS label, excluding the TTL field. For example, the MSBit of the label may be bit 0, the LSBit may be bit 19, the EXP bits may be bits 20-22, and bit 23 may be the S bit. In one embodiment, a replying router may fill in the EXP and S bits; the LSR receiving the echo reply may ignore these bits. Exemplary values for downstream label field 1030 are as follows:

| Protocol # | Signaling Protocol |
|---|---|
| 0 | Unknown |
| 1 | Static |
| 2 | BGP |
| 3 | LDP |
| 4 | RSVP-TE |

Figure 11:
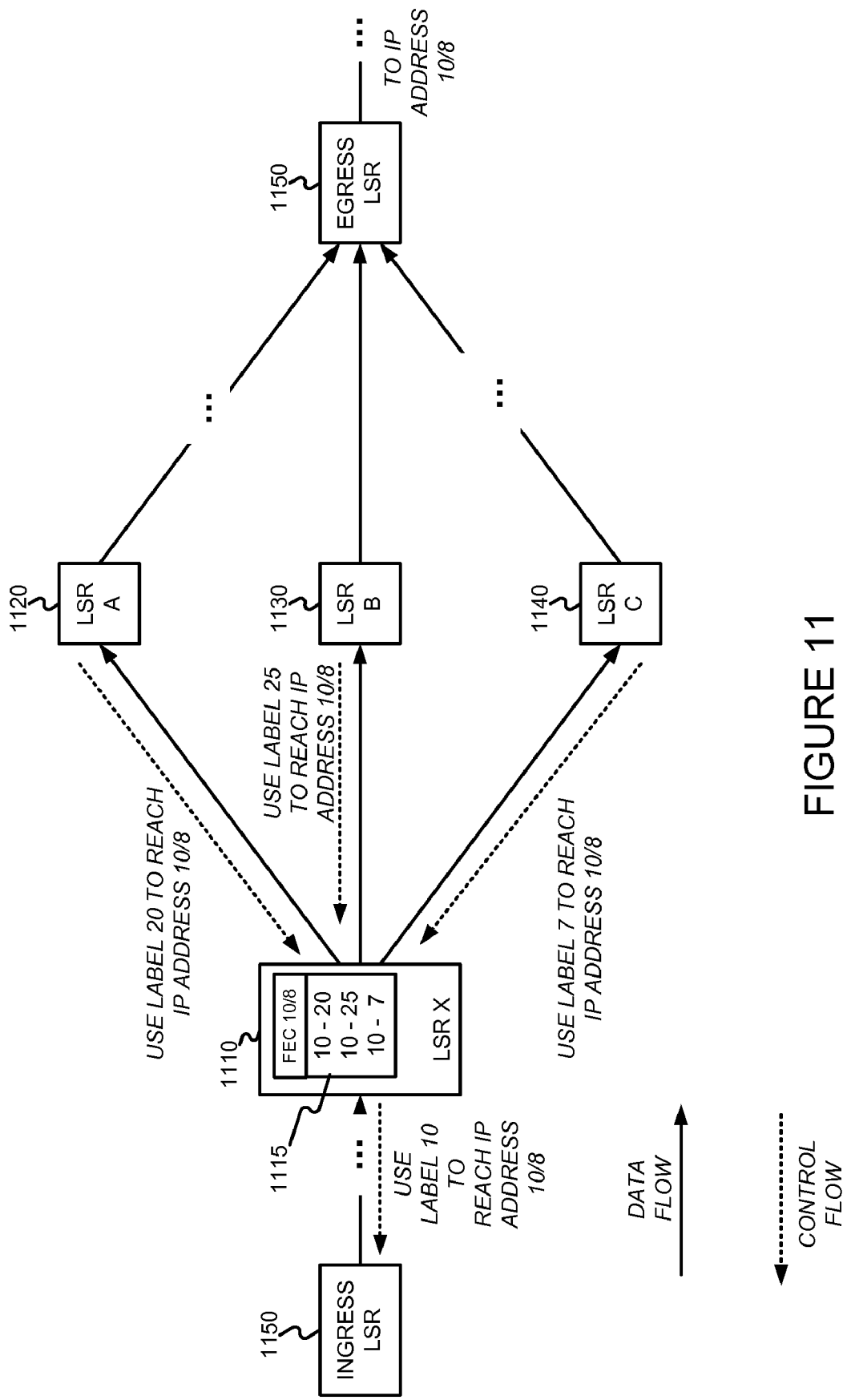
FIG. 11 is a block diagram illustrating the concept of downstream mapping.

FIG. 11 illustrates how a downstream router is defined. Consider an LSR X 1110 and a FEC for all packets with an IP address prefix 10/8. Assume that an LSR A 1120, an LSR B 1130 and an LSR C 1140 have advertised their labels bound to a FEC corresponding to IP address prefix 10/8 to upstream LSR X 1110, and that LSR X 1110 advertises its label bound to the FEC corresponding to IP address prefix 10/8 to its upstream LSR or LSRs. As shown by table 1115, the FEC can be used to bind the label used by LSR X 1110 (namely 10) with those of downstream LSRs 1120,1130,1140 (namely, 20, 25 and 7). However, LSR X 1110 may, subject to some policy constraint for example, decide that it only wants to use LSR A 1120 and LSR B 1130 as downstream routers for this FEC. Consistent with principles of the invention, LSR X would consider LSR A 1120 and LSR B 1130 to constitute its set of downstream routers.

Downstream routers may be defined when sending and receiving fault isolation messages. Unlike requests that test end-to-end connectivity, fault isolation requests test each segment along the LSP, verifying that the LSP is set up correctly, checking the data plane against the control plane and isolating faults. To do this, a fault isolation request is sent to the first router or routers along the LSP, and is subsequently sent to the next set of routers along the LSP. Typically, this is accomplished using the time-to-live (TTL) field in the label: if the TTL is set to N, one router among the Nth set of routers will receive the packet; having received a reply from that router, the ingress LSR then sets the TTL to N+1, and so on until the egress is reached. In this example, TTL corresponds to hop count, which is the way TTL has been used customarily. Alternative ways of reaching each router along the LSP path in order may also be used.

If a fault isolation request packet with outermost label 10 arrives at LSR X 1110, LSR X 1110 determines which LSRs could be the next recipients of the packet, and what label they would see. Here, the downstream routers and their corresponding labels for X with respect to label 10 are {LSR A,20} and {LSR B,25}.

Although not the case in the example illustrated in FIG. 11, LSR X 1110 could be the ingress LSR of the LSP, and/or LSR A 1120, LSR B 1130 and LSR C 1140 could be egress LSRs of the LSP. If LSR X 1110 is the LSR originating the fault isolation echo request, then LSR X 1110 determines which LSRs would be the first recipients of a fault isolation message to the FEC stack that is being tested.

The following is an example illustrating an exemplary embodiment of the present invention. Consider an LSP between an ingress LSR and an egress LSR spanning multiple LSR hops.

Before initiating a liveliness test consistent with the teachings of the invention, it should be verified that both the ingress LSR and egress LSR can support MPLS ping.

When an LSP is to be tested, using the teachings of the invention, the ingress LSR may send known MPLS echo request messages over the LSP periodically. The period may be controlled by a timer. The value of the time interval should be configurable. Note that if there are multiple LSPs between the ingress and egress LSRs, the MPLS echo request messages may be differentiated by using unique identifiers in the Identifier field or by using unique source port numbers in the IP header of the echo request message.

If the ingress LSR does not receive MPLS echo reply messages from the egress LSR for a long period of time, there may be a failure (a) on the LSP from the ingress LSR to the egress LSR, (b) on the reverse path (from egress to ingress), or (c) both.

To distinguish between a failure in the forward path (the MPLS LSP path being 'pinged') and a failure in the return path, the present invention uses a return path presumed to be reliable. For example, it is assumed that the IP control and data planes are reliable. If, however, the forwarding in the return path is itself via an MPLS LSP, such reliability cannot be presumed. A potentially unreliable return path can be avoided, consistent with the present invention in one of two ways. First, the Router Alert option may be set in the MPLS echo reply. When a router sees this option, it will forward the packet as an IP packet, thereby avoiding a potentially unreliable return path. Second, the echo reply may be sent via the control plane.

When the ingress LSR suspects that the LSP may have failed (e.g., due to a failed MPLS echo request test), but the signaling (e.g., RSVP, LDP, BGP, etc.) control plane indicates that the LSP is operational, the ingress LSR may send one or more MPLS echo request messages to the egress over the LSP with a notation that the reply should be sent over the control plane. A method for sending replies over an RSVP control plane is described in U.S. patent application Ser. No. 10/179, 927, entitled "DETECTING DATA PLANE LIVELINESS IN CONNECTIONS SUCH AS LABEL-SWITCHED PATHS", filed on Jun. 25, 2002 and listing Ping Pan and Nischal Sheth as inventors (Referred to as "the Pan application").

Figure 12:
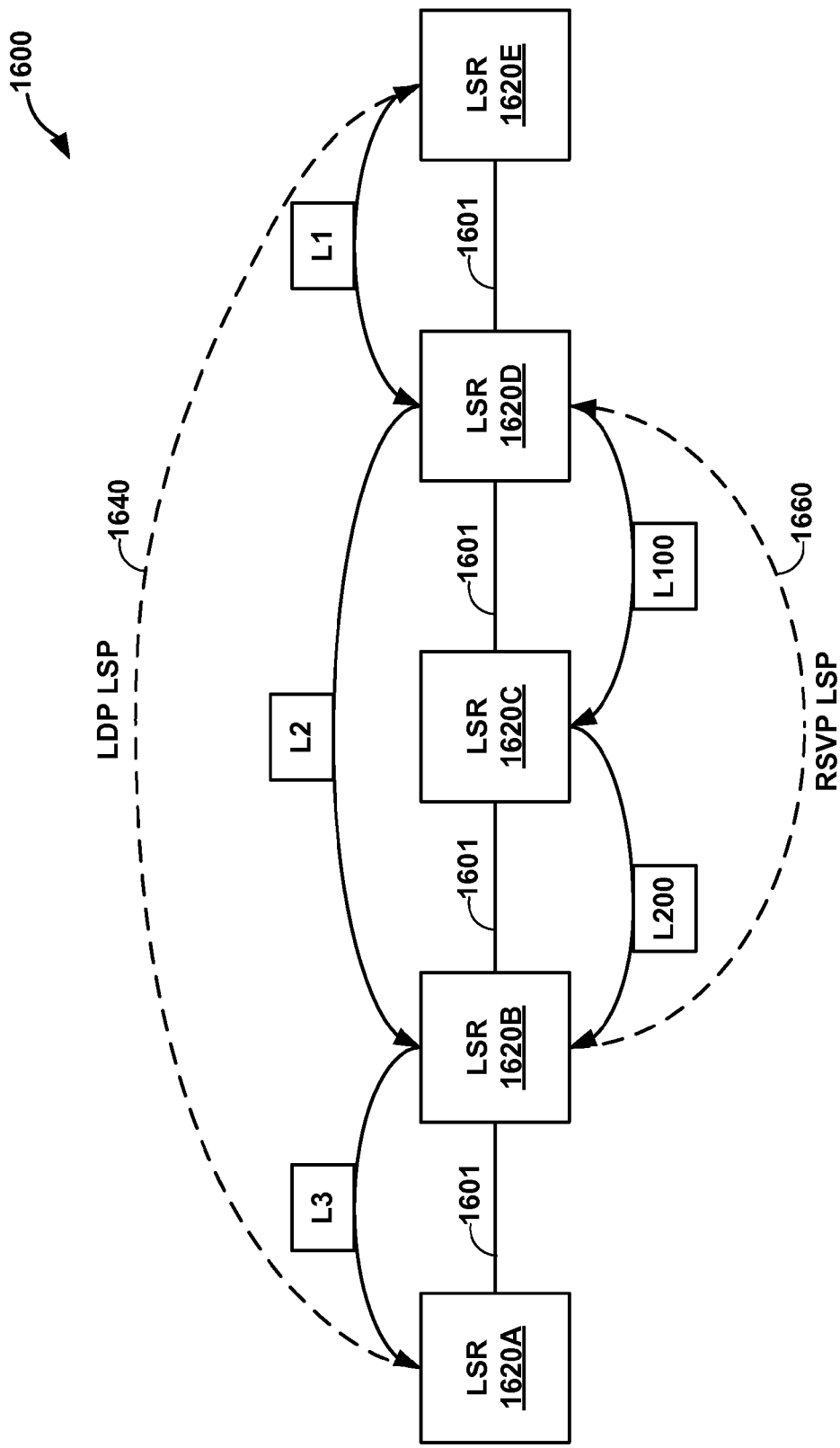
FIG. 12 is a block diagram illustrating an example system having label-switching routers (LSRs) that detect data plane failures in MPLS LSPs that may be tunneled over one or more other LSPs.

FIG. 12 is a block diagram illustrating an example system 1600 having label-switching routers (LSRs) 1620A-1620E ("LSRs 1620") that detect failures (e.g., data plane failures) in MPLS LSPs that may be tunneled over one or more other LSPs. The arrows in FIG. 12 represent logical LSPs, where physical connections are shown as links 1601.

As illustrated in FIG. 12, a label distribution protocol (LDP) LSP 1640 extends from ingress LSR 1620A to egress LSR 1620E. In addition, a Resource Reservation Protocol (RSVP) LSP 1660 extends from LSR 1620B to LSR 1620D. In general, LDP traffic carried by LDP LSP 1640 is tunneled through RSVP LSP 1660.

Specifically, ingress LSR 1620A and egress LSR 1620E are endpoints to LDP LSP 1640; LSRs 1620B and 1620D are intermediate LSRs to LDP LSP 1640. As such, a direct LDP relationship exists between LSR 1620B and LSR 1620D. Similarly, LSR 1620B is the ingress LSR to RSVP LSP 1660, LSR 1620D is the egress LSR, and LSR 1620C is an intermediate LSR. LDP LSP 1640 is tunneled through RSVP LSP 1660.

In setting up LDP LSP 1640, each of LSRs 1620B, 1620D, and 1620E sends a label map message to the respective upstream LSR 1620 in LDP LSP 1640. For example, LSR 1620E advertises to LSR 1620D to use label L1 when sending traffic to LSR 1620E over LDP LSP 1640. LSR 1620D advertises to LSR 1620B to use label L2 when sending traffic to LSR 1620D over LDP LSP 1640. Finally, LSR 1620B advertises to LSR 1620A to use label L3 when sending traffic to LSR 1620B over LDP LSP 1640.

Similarly, when RSVP LSP 1660 is being established, each of LSRs 1620D and 1620C sends a label map message to the respective upstream LSR 1620 in RSVP LSP 1660. For example, LSR 1620D advertises to LSR 1620C to use label L100 when sending traffic to LSR 1620D over RSVP LSP 1660. In addition, LSR 1620C advertises to LSR 1620B to use label L200 when sending traffic to LSR 1620C over RSVP LSP 1660.

When network traffic is subsequently sent over LDP LSP 1640 and RSVP LSP 1660, LSRs use the labels to determine where to send the network traffic. Intermediate LSRs in LSPs 1640, 1660 swap the label of a received packet with the correct label based on the label map messages previously received, and forward the packet to the next hop.

The techniques described above may be extended to apply to situations such as the one illustrated in FIG. 12, in which one or more LSPs are tunneled through one or more other LSPs. In the absence of the extensions described herein, nodes along the LSP tunnel may respond with an error message when receiving an LSP ping or traceroute request, even where there is no connectivity problem with the LSP.

That is, LSR 1620A is typically unaware of RSVP LSP 1660. When LSR 1620A tests LDP LSP 1640 for connectivity, LSR 1620A may use the "ping mode" of the LSP ping mechanism described above to send an MPLS echo request along LDP LSP 1640 to LSR 1620E. If LSR 1620A does not receive an MPLS echo reply packet from LSR 1620E within a time period, LSR 1620A may assume that connectivity is broken somewhere along LDP LSP 1640. LSR 1620A may then use a "traceroute mode" of LSP ping for performing fault isolation. For example, LSR 1620A may send a series of MPLS echo requests having different time-to-live (TTL) values to prompt each LSR along LDP LSP 1640 to send an MPLS echo reply.

As described, LSR 1620A sends an MPLS echo request having one or more MPLS labels in the data plane, and indicating in the control plane the LSP to be tested in the FEC stack. For example, LSR 1620A sends an MPLS echo request packet having label L3 in the data plane and the FEC stack in the control plane indicates that an LDP LSP having destination LSR 1620E is being tested (LDP LSP, dst=LSR 1620E). When the TTL value of the MPLS echo request packet is equal to 1, the MPLS echo request packet stops at LSR 1620B.

LSR 1620B receives the MPLS echo request and, since the TTL was 1, compares the information in the data plane of the MPLS echo request to the information in the control plane to verify that it matches. LSR 1620B sees that the LDP label L3 is consistent with the FEC (LDP LSP, dst=LSR 1620E). LSR 1620B also analyzes its forwarding information and determines that LSR 1620B is an ingress router of RSVP LSP 1660 over which LDP LSP 1640 is tunneled. In responding to the MPLS echo request, LSR 1620B forms an MPLS echo reply packet that verifies that connectivity up to that point is good, and includes instructions (e.g., data or information) to LSR 1620A to add (RSVP LSP, dst=LSR 1620D) to the FEC stack of subsequent MPLS echo requests. In other words, the LSR 1620B outputs a modified MPLS echo reply packet to include additional information providing ingress LSR 1620 with additional information related to the intermediate LSP tunnel. LSR 1620A receives and stores the instructions for use in forming future MPLS echo requests for testing LDP LSP 1640.

LSR 1620A sends the next MPLS echo request in the traceroute mode having a label L3, a FEC stack having both (LDP LSP, dst=LSR 1620E) and (RSVP LSP, dst=LSR 1620D), and a TTL value of 2. In this way, the subsequent MPLS echo request includes FEC information for both LDP LSP 1640 and RSVP LSP 1660, at least up to the next hop past LSR 1620B. When LSR 1620B receives the MPLS echo request, LSR 1620B swaps label L3 with label L2 and pushes an outer label L200 onto the MPLS echo request, decrements the TTL value to 1, and outputs the MPLS echo request packet to LSR 1620C.

LSR 1620C receives the MPLS echo request and, since the TTL was 1, compares the information in the data plane of the MPLS echo request to the information in the control plane to verify that it matches. For example, since LSR 1620C is an intermediate node of RSVP LSP 1660, LSR 1620C is only interested in the outer label and outer FEC of the FEC stack. LSR 1620C compares the outer RSVP label L200 with the outer FEC (RSVP LSP, dst=LSR 1620D), sees that they are consistent, and sends an MPLS echo reply to LSR 1620A indicating that connectivity up to that point is good. In the absence of LSR 1620B having sent the FEC stack instructions, LSR 1620A would not have included (RSVP LSP, dst=LSR 1620D) within the FEC stack of the MPLS echo request, and so LSR 1620C would have found an inconsistency in comparing outer RSVP label L200 with the FEC (LDP LSP, dst=LSR 1620E), and reported an error.

LSR 1620A sends the next MPLS echo request in the traceroute mode having a label L3, a FEC stack having both (LDP LSP, dst=LSR 1620E) and (RSVP LSP, dst=LSR 1620D), and a TTL value of 3. When LSR 1620B receives the MPLS echo request, LSR 1620B swaps label L3 with label L2 and pushes an outer label L200 onto the MPLS echo request, decrements the TTL value to 2, and outputs the MPLS echo request packet to LSR 1620C. When LSR 1620C receives the MPLS echo request, LSR 1620C swaps the outer RSVP label L200 with RSVP label L100, decrements the TTL value to 1, and outputs the packet to LSR 1620D.

LSR 1620D receives the MPLS echo request and, since the TTL was 1, compares the information in the data plane of the MPLS echo request to the information in the control plane to verify that it matches. Since LSR 1620D is the egress LSR of RSVP LSP 1660, LSR 1620D will look deeper into the MPLS echo request than just the outer layer. LSR 1620D compares the outer RSVP label L100 with the outer FEC (RSVP LSP, dst=LSR 1620D), and sees that they are consistent. LSR 1620D also compares the inner LDP label L2 with the inner FEC (LDP LSP, dst=LSR 1620E), and sees that they are consistent. LSR 1620D recognizes that LSR 1620D is the egress LSR of RSVP LSP 1660, and sends an MPLS echo reply to LSR 1620A indicating that connectivity is good. Also in the MPLS echo reply, LSR 1620D instructs LSR 1620A to modify the FEC stack of subsequent MPLS echo requests by removing FEC (RSVP LSP, dst=LSR 1620D) from the FEC stack. This may be considered analogous to what happens at LSR 1620D in the data plane, where LSR 1620D will "pop" (i.e., remove) the outer RSVP label before forwarding an MPLS packet to the next hop. LSR 1620A receives the MPLS echo reply from LSR 1620D and stores the received FEC stack instructions for sending future MPLS echo requests for testing LDP LSP 1640.

LSR 1620A sends the next MPLS echo request in the traceroute mode having a label L3, a FEC stack having (LDP LSP, dst=LSR 1620E), and a TTL value of 4. When LSR 1620B receives the MPLS echo request, LSR 1620B swaps label L3 with label L2 and pushes an outer label L200 onto the MPLS echo request, decrements the TTL value to 3, and outputs the MPLS echo request packet to LSR 1620C. When LSR 1620C receives the MPLS echo request, LSR 1620C swaps the outer RSVP label L200 with RSVP label L100, decrements the TTL value to 2, and outputs the packet to LSR 1620D. When LSR 1620D receives the MPLS echo request, LSR 1620D pops the outer RSVP label L100, swaps the LDP label L2 with LDP label L1, decrements the TTL value to 1, and outputs the packet to LSR 1620E.

LSR 1620E receives the MPLS echo request and, since the TTL was 1, compares the information in the data plane of the MPLS echo request to the information in the control plane to verify that it matches. LSR 1620E compares the LDP label L1 with the FEC (LDP LSP, dst=LSR 1620E), and sees that they are consistent. LSR 1620E sends an MPLS echo reply to LSR 1620A indicating that connectivity is good. LSR 1620A now knows that there are no faults along LDP LSP 1640.

In this manner, LSR 1620A is able to use the traceroute mode of the LSP ping mechanism as extended herein to test connectivity of LDP LSP 1640, even where LDP LSP 1640 is tunneled through RSVP LSP 1660 and LSR 1620A is unaware of the tunneling. The LSP ping mechanism is extended to allow intermediate LSRs of an overall LSP at the ingress or egress of an LSP tunnel to identify when additional FEC stack instructions need to be provided to the ingress LSR doing the testing of the overall LSP. For example, with reference to request or reply object 700 of FIG. 7, the extensions may provide for defining a new return code 760 and defining a new FEC TLV sub-field 780 within the MPLS echo reply packets to accommodate these mechanisms. For example, additional information may be carried in the FEC TLV sub-field 780 to carry the FEC stack instructions and identifying a FEC to be used.

Figure 13:
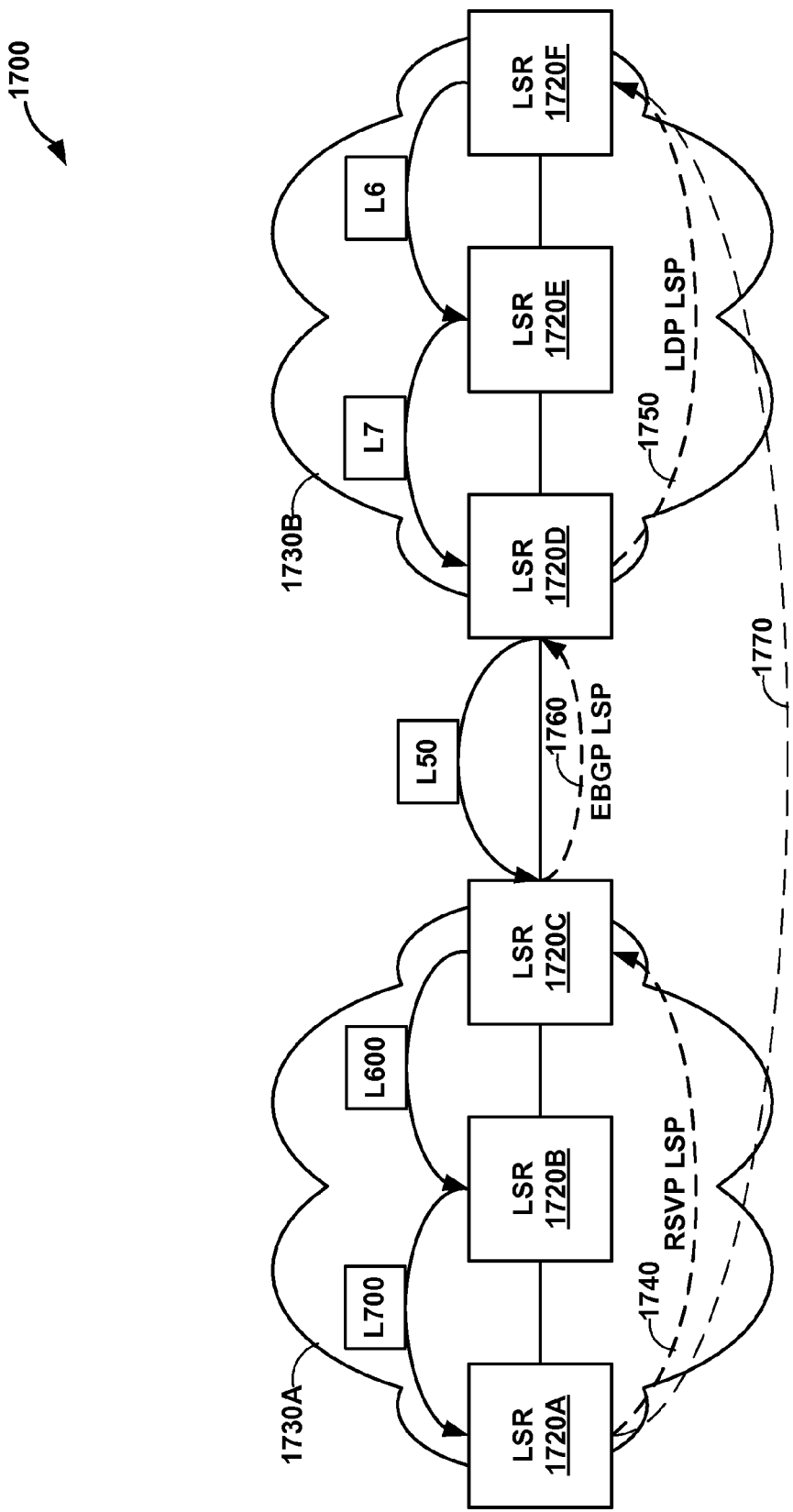
FIG. 13 is a block diagram illustrating an example system having LSRs that detect data plane failures in an end-to-end inter-autonomous system MPLS LSP that includes LSPs from different autonomous systems that are stitched together.

FIG. 13 is a block diagram illustrating an example system 1700 having LSRs that detect data plane failures in an end-to-end inter-autonomous system MPLS LSP 1770 that includes LSPs 1740, 1750 from different autonomous systems 1730A and 1730B that are stitched together. As illustrated in FIG. 13, end-to-end inter-autonomous system (AS) LSP 1770 extends from LSR 1720A of AS 1730A to LSR 1720F of AS 1730B. AS 1730A may run RSVP and AS 1730B may run LDP. In other embodiments, AS 1730A and AS 1730B may run the same protocol.

RSVP LSP 1740 extends from LSR 1720A to LSR 1720C, and is stitched to LDP LSP 1750 via External Border Gateway Protocol (EBGP) LSP 1760. EBGP LSP 1760 extends from LSR 1720C to LSR 1720D, and LDP LSP 1750 extends from LSR 1720D to LSR 1720F.

The extended LSP ping mechanism operates in system 1700 in a manner similar to that described above with respect to FIG. 12. For example, LSR 1720A may be unaware of EBGP LSP 1760 and LDP LSP 1750. Thus, when LSR 1720A initially sends an MPLS echo request packet, it may only include FEC (RSVP LSP, dst=LSR 1720F). In the absence of the extensions described herein, LSR 1720D, for example, would find that the outer EBGP label L50 is inconsistent with FEC (RSVP LSP, dst=LSR 1720F), and return an error message.

In accordance with the principles of the invention, when LSR 1720C receives an MPLS echo request packet from LSR 1720A, LSR 1720C identifies that LSR 1720C is the egress of RSVP LSP 1740 and the ingress of EBGP LSP 1760. LSR 1720C sends an MPLS echo reply to LSR 1720A containing instructions (e.g., data or information) to modify the FEC stack of the MPLS echo request by replacing FEC (RSVP LSP, dst=LSR 1720F) with FEC (EBGP LSP, dst=LSR 1720F). For example, the instructions within MPLS echo reply may simply be the new FEC information for the EBGP LSP to be added by LSR 1720A and a position indicator within the stack for the FEC information to be replaced. In other words, the FEC stack modification instructions within the MPLS echo reply may consist of simply a new FEC as indicated within a TLV sub-field of the MPLS echo reply, without explicit instructions. Alternatively, the MPLS echo reply may indicate the FEC information that is to be removed and the FEC information that is to be added. Alternatively or additionally, the MPLS echo reply may include a return code that is defined in a manner to indicate what action should be taken with respect to the new FEC information contained within the MPLS echo reply.

Similarly, when LSR 1720D receives an MPLS echo request packet from LSR 1720A, LSR 1720D identifies that LSR 1720D is the egress of EBGP LSP 1760 and the ingress of LDP LSP 1750. LSR 1720D sends an MPLS echo reply to LSR 1720A containing instructions to modify the FEC stack by replacing FEC (EBGP LSP, dst=LSR 1720F) with FEC (LDP LSP, dst=LSR 1720F).

LSR 1720A receives and stores the FEC modification instructions and follows the instructions in sending subsequent MPLS echo requests for testing connectivity of end-to-end LSP 1770. In this manner, the FEC stacks in the control plane of the MPLS echo requests should be consistent with the labels in the data plane of the MPLS echo requests, allowing LSR 1720 to test connectivity and perform fault isolation on end-to-end inter-AS LSP.

Figure 14:
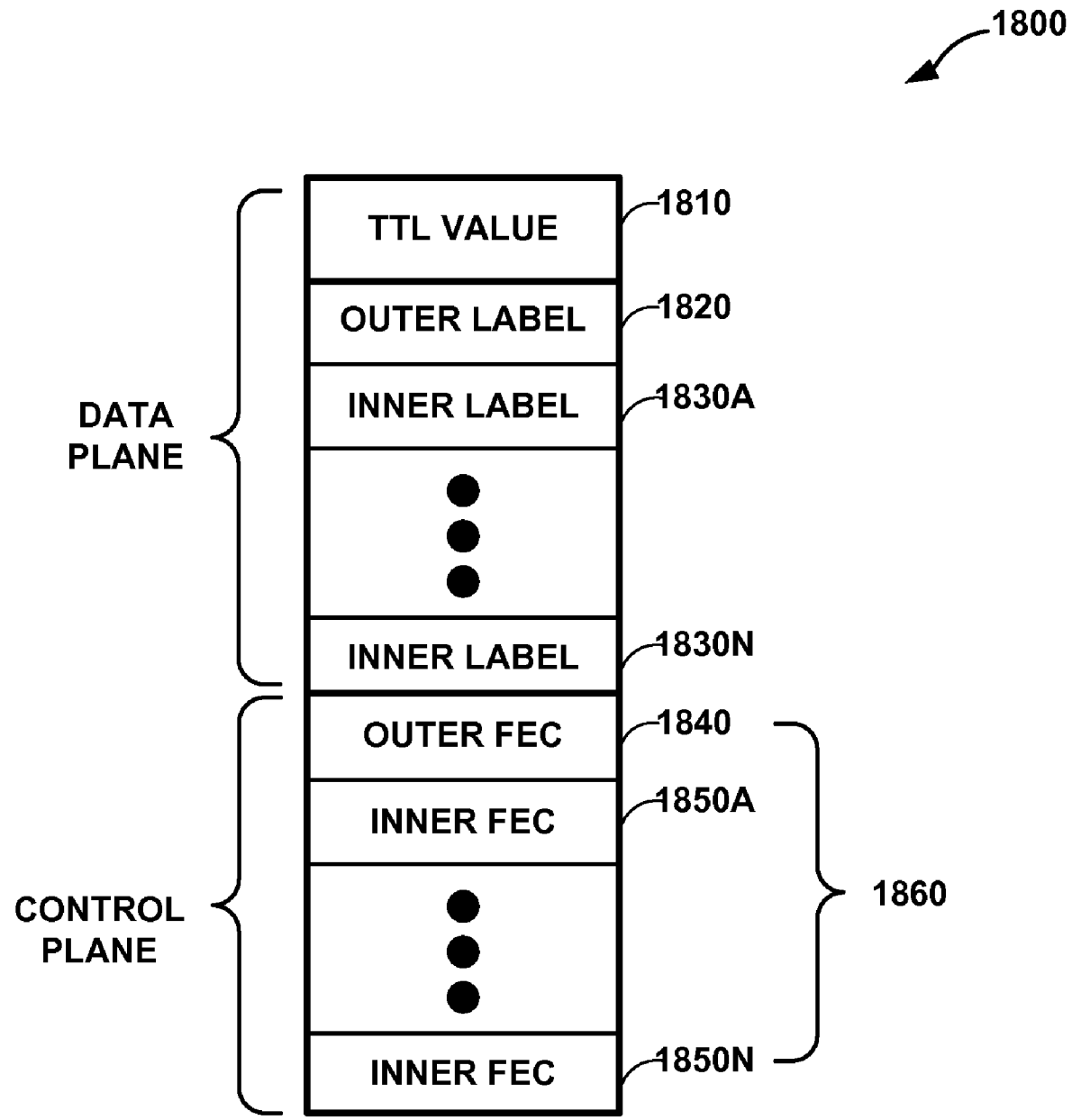
FIG. 14 is a block diagram illustrating a simplified example of an MPLS echo request packet.

FIG. 14 is a block diagram illustrating a simplified example of an MPLS echo request packet 1800 that has been extended to include additional information for testing the connectivity of an LSP when the LSP traverses one or more downstream LSP tunnels or is stitched to one or more additional LSPs. As shown in FIG. 14, MPLS echo request packet 1800 includes a data plane and a control plane. The data plane includes a TTL value 1810, and an outer label 1820. The data plane may also optionally include one or more inner labels 1830A-1830N. The control plane includes a FEC stack 1860. FEC stack 1860 may include an outer FEC 1840. FEC stack 1860 may also optionally include one or more inner FECs 1850A-1850N. As described above, an ingress LSR in an LSP may send an MPLS echo request packet to test connectivity and perform fault isolation on an LSP. The ingress LSR may modify FEC stack 1860 in accordance with instructions (e.g., data or other information) received from intermediate LSRs of the LSP being tested, e.g., to include additional FEC information, to swap current FEC information with other FEC information, and/or to remove FEC information based on the downstream topology of the network traversed by the LSP.

Figure 15:
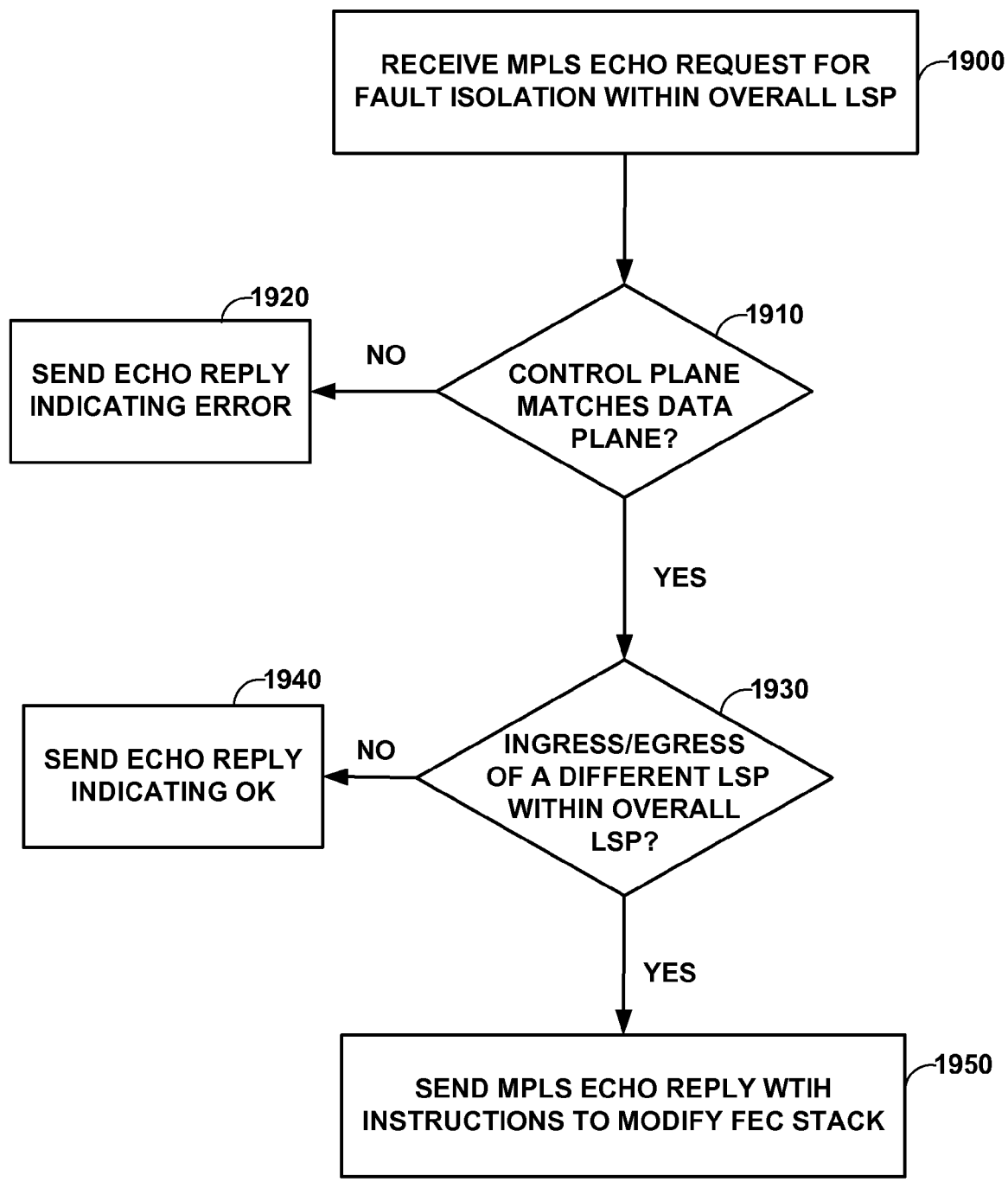
FIG. 15 is a flowchart illustrating exemplary operation of an intermediate LSR in an LSP consistent with the principles of the invention.

FIG. 15 is a flowchart illustrating exemplary operation of an intermediate LSR in an LSP consistent with the principles of the invention. For purposes of example, FIG. 15 will be described using the example of LSR 1720C of FIG. 13. LSR 1720C receives an MPLS echo request from LSR 1720A as LSR 1720A is testing for fault isolation within overall LSP 1770 (1900). When the TTL value of the MPLS echo request is 1, LSR 1720C may swap the outer label and forward the MPLS echo request to the next hop. When the TTL value of the MPLS echo request is 1, LSR 1720C checks whether information within the control plane of the MPLS echo request matches information within the data plane of the MPLS echo request (1910). If not, LSR 1720C sends an MPLS echo reply to LSR 1720A indicating an error has occurred (1920).

If the information is consistent between the control plane and the data plane, LSR 1720C looks downstream to determine whether LSR 1720C is an ingress LSR into which traffic from the LSP being tested is tunneled, or whether LSR 1720C stitches the tested LSP to a different LSP (i.e., is an ingress LSR of a different LSP within the overall LSP being tested) (1930). For example, LSP test and diagnostic operations 370 (FIG. 3) of LSR 1720C may determine this by reference to stored label-based forwarding information 390. If this is not the case, LSR 1720C sends an MPLS echo reply without modification to LSR 1720A indicating that connectivity is good up to this point (1940). However, in the example of FIG. 13, LSR 1720C determines that LSR 1720C is LSR 1720C is the egress of RSVP LSP 1740 and the ingress of EBGP LSP 1760. LSR 1720C sends an MPLS echo reply to LSR 1720A containing instructions (e.g., data or information) necessary to modify the FEC stack by replacing FEC (RSVP LSP, dst=LSR 1720F) with FEC (EBGP LSP, dst=LSR 1720F) (1950). For example, LSP test and diagnostic operations 370 may create the MPLS echo reply packet containing the appropriate instructions.

Figure 16:
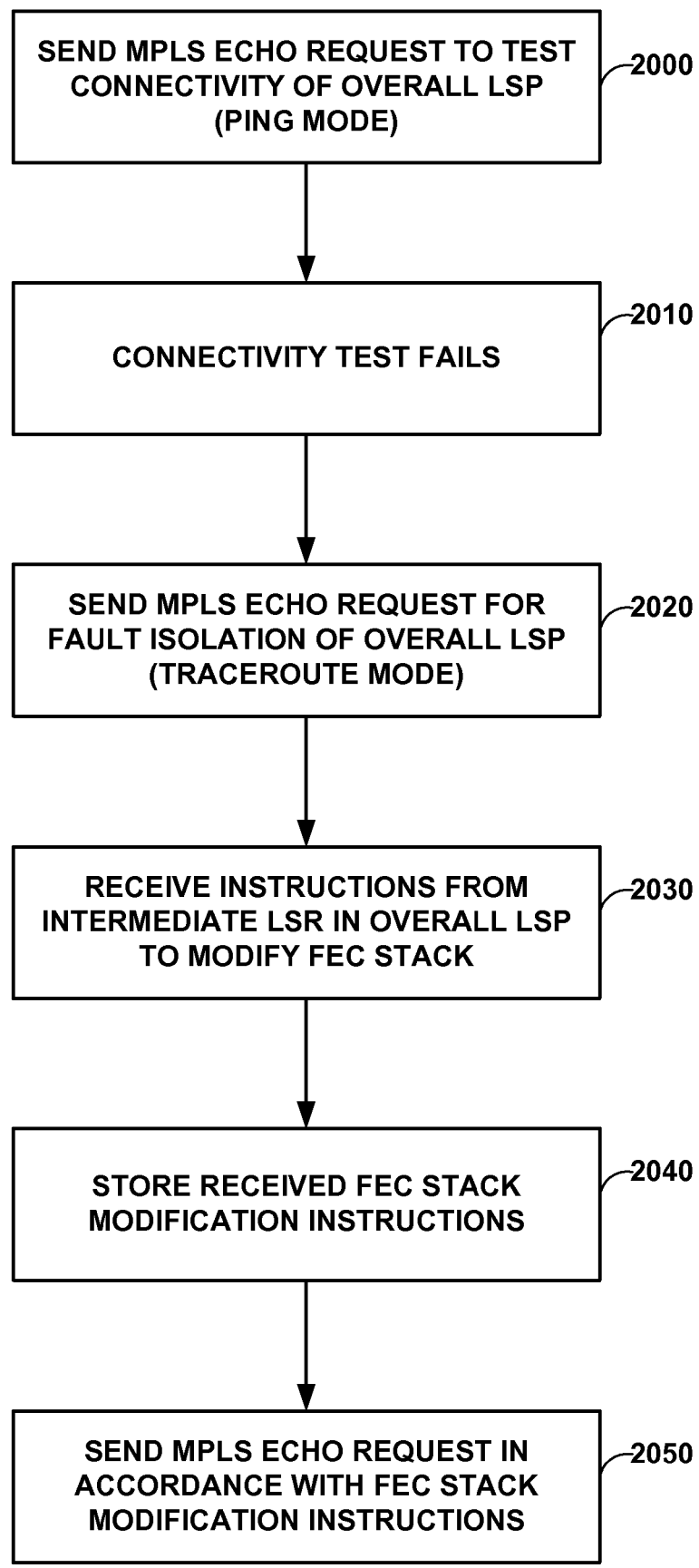
FIG. 16 is a flowchart illustrating exemplary operation of an ingress LSR in detecting and isolating data plane failures in an MPLS LSP consistent with the principles of the invention.

FIG. 16 is a flowchart illustrating exemplary operation of an ingress LSR in detecting and isolating data plane failures in an MPLS LSP consistent with the principles of the invention. For purposes of example, FIG. 16 will be described using the example of LSR 1720A of FIG. 13. LSR 1720A sends an MPLS echo request using the ping mode of LSP ping to test connectivity of end-to-end inter-AS LSP 1770 (2000). For example, LSR 1720A may send an MPLS echo request to the next hop along LSP 1770 with a TTL value of 255.

The connectivity test of end-to-end inter-AS LSP 1770 may fail (2010), for example, because LSR 1720F receives the MPLS echo request and sees that the FEC in the control plane identifies the RSVP LSP 1740, while the label in the data plane is LDP label L6. As a result of this inconsistency, LSR 1720F may discard the MPLS echo request or may send an error message.

In response to the failed connectivity test, LSR 1720A uses the traceroute mode of LSP ping to isolate the fault within end-to-end inter-AS LSP 1770. LSR 1720A sends MPLS echo requests according to the traceroute mode, as described with respect to FIG. 13 (2020). In response to the MPLS echo requests, LSR 1720A receives instructions (e.g., data or information) from one or more intermediate LSRs along end-to-end inter-AS LSP 1770 for modification of the FEC stack for different TTL values when testing end-to-end inter-AS LSP 1770 (2030). LSR 1720A stores the FEC stack modification instructions (2040). Thereafter, LSR 1720A sends MPLS echo requests in accordance with the FEC stack modification instructions (2050). As a result, when LSR 1720A subsequently attempts to test connectivity of end-to-end inter-AS LSP 1770 using the ping mode of LSP ping, LSR 1720A will use the stored instructions and send the proper FEC stack. Consequently, LSRs such as LSR 1720F will find that the control plane matches the data plane within the MPLS echo requests, and will not need to send error responses. In this manner, the extensions to LSP ping described herein allow the ping mode of LSP ping to be used to verify connectivity of end-to-end inter-AS LSP 1770.

Figure 17:
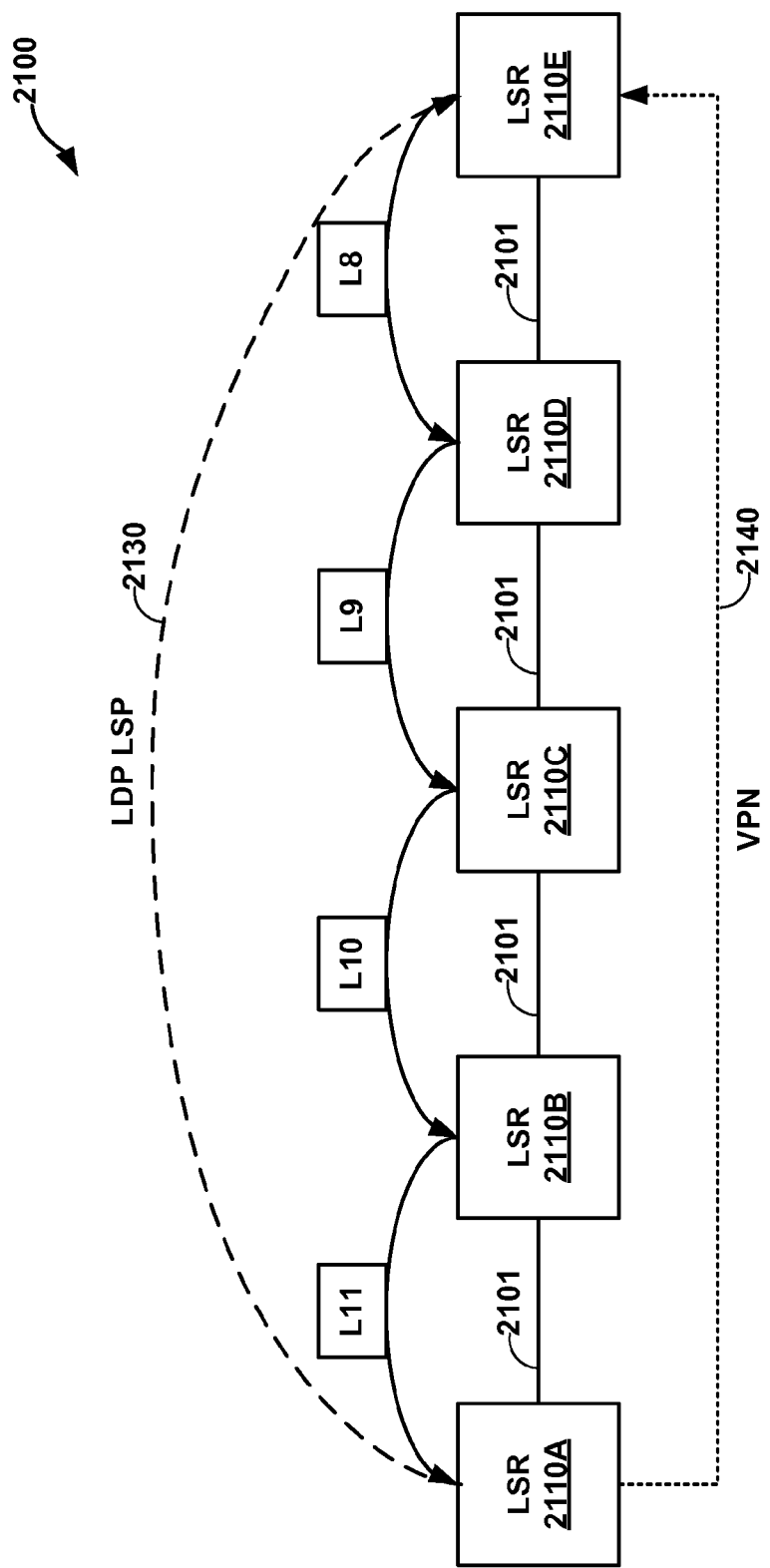
FIG. 17 is a block diagram illustrating an example system having LSRs that detect data plane failures in an MPLS LSP over which a virtual private network (VPN) is established.

FIG. 17 is a block diagram illustrating an example system 2100 having LSRs 2110A-2110E that detect data plane failures in an LDP LSP 2130 over which a virtual private network (VPN) 2140 is established. For example, LSR 2110A may wish to test VPN 2140 that is tunneled over LDP LSP 2130 with egress. The extended LSP ping mechanism operates in system 2100 in a manner similar to that described above to allow intermediate LSRs of LDP LSP 2130 to provide instructions to ingress LSR 2110A to include information about both VPN 2140 and LDP LSP 2130 in the FEC stack of MPLS echo request packets.

Various embodiments of the invention have been described. These and other embodiments are within the scope of the following claims.

The invention claimed is:

1. A system comprising:
    an ingress label-switching router (LSR) of a first label-switched path (LSP); and
    an intermediate LSR of the first LSP,
    wherein the ingress LSR of the first LSP tests connectivity of the first LSP by sending a Multi-Protocol Label Switching (MPLS) echo request packet that includes both a label stack having a label for directing the MPLS echo request packet along the first LSP and a forwarding equivalence class (FEC) stack specifying a FEC identifying the first LSP, and
    wherein, upon receiving the MPLS echo request packet, the intermediate LSR sends an MPLS echo reply packet to the ingress LSR that includes information that instructs the ingress LSR to modify the FEC stack specified within subsequent MPLS echo request packets to be sent by the ingress LSR for testing connectivity of the first LSP.

2. The system of claim 1, wherein the intermediate LSR operates as an ingress LSR of a second LSP over which a portion of the first LSP is tunneled, and wherein the MPLS echo reply packet includes information that specifies a FEC that identifies the second LSP and instructs the ingress LSR of the first LSP to add to the FEC stack of the subsequent MPLS echo request packets the FEC that identifies the second LSP.

3. The system of claim 2, wherein the intermediate LSR operates as an egress LSR of the second LSP, and wherein the MPLS echo reply packet includes information that specifies a FEC that identifies the second LSP and instructs the ingress LSR of the first LSP to remove from the FEC stack of the subsequent MPLS echo request packets the FEC that identifies the second LSP.

4. The system of claim 2, wherein the first LSP is of a different type than the second LSP.

5. The system of claim 4, wherein the first LSP is a label distribution protocol (LDP) LSP, and wherein the second LSP is a Resource Reservation Protocol (RSVP) LSP.

6. The system of claim 1, wherein the intermediate LSR determines whether the intermediate LSR is one of an ingress LSR or an egress LSR of a second LSP over which a portion of the first LSP is tunneled based on information within a control plane portion of the MPLS echo request packet and information within a data plane portion of the MPLS echo request packet and based on a downstream topology of a network traversed by the first LSP.

7. The system of claim 1, wherein the intermediate LSR operates as an ingress LSR of a second LSP to which the first LSP is stitched, and wherein the MPLS echo reply packet includes information that specifies a FEC that identifies the second LSP and instructs the ingress LSR of the first LSP to change the FEC in the FEC stack of the subsequent MPLS echo request packets that identifies the first LSP to the FEC that identifies the second LSP.

8. The system of claim 7,
    wherein the first LSP is associated with a first autonomous system;
    wherein the second LSP is associated with a second autonomous system, further comprising:
    an end-to-end LSP that includes the first LSP and the second LSP, wherein the first LSP and the second LSP are stitched together to form the end-to-end LSP;
    wherein the ingress LSR of the first LSR comprises an ingress LSR of the end-to-end LSP that tests connectivity of the end-to-end LSP by sending the MPLS echo request packet.

9. The system of claim 8, wherein the MPLS echo reply packet includes information that specifies a FEC identifying the second LSP, wherein the information instructs the ingress LSR to modify the FEC stack of the subsequent MPLS echo request packets by replacing the FEC identifying the first LSP with the FEC identifying the second LSP.

10. The system of claim 8, wherein the intermediate LSR is an egress LSR of the first LSP.

11. The system of claim 8, wherein the intermediate LSR is an ingress LSR of the second LSP.

12. The system of claim 7, wherein the intermediate LSR determines whether the intermediate LSR is one of an egress LSR of the first LSP or an ingress LSR of the second LSP based on information within a control plane portion of the MPLS echo request packet and information within a data plane portion of the MPLS echo request packet and based on a downstream topology of a network traversed by the end-to-end LSP.

13. A method comprising:
    testing connectivity of a label switched path (LSP) that is tunneled through at least one other LSP using LSP ping executing on a label switched router (LSR) by sending a Multi-Protocol Label Switching (MPLS) echo request packet with the LSR that includes both a label stack specifying a label for directing the MPLS echo request packet along the other LSP and a forwarding equivalence class (FEC) stack specifying a FEC identifying the other LSP; and
    receiving an MPLS reply packet from an intermediate LSR along the LSP having instructions to modify the FEC stack specified within subsequent MPLS echo request packets sent by the LSR for testing connectivity of the LSP to specify both the FEC identifying the other LSP and a second FEC identifying the tunneled LSP.

14. A method comprising:
with an ingress label-switching router (LSR) of a label-switched path (LSP), sending a Multi-Protocol Label Switching (MPLS) echo request packet that includes both a label stack having a label for directing the MPLS echo request packet along the first LSP and a forwarding equivalence class (FEC) stack specifying a FEC identifying the LSP to test connectivity of the LSP;
receiving the MPLS echo request packet with an intermediate LSR of the LSP; and
with the intermediate LSR, in response to receiving the MPLS echo request packet, sending an MPLS echo reply packet to the ingress LSR that includes information that instructs the ingress LSR to modify the FEC stack specified within subsequent MPLS echo request packets to be sent by the ingress LSR for testing connectivity of the LSP.

15. The method of claim 14, further comprising:
with the ingress LSR, sending subsequent MPLS echo request packets for testing connectivity of the LSP, wherein the subsequent MPLS echo request packets include a modified FEC stack in accordance with the information included in the MPLS echo reply packet received from the intermediate LSR.

16. The system of claim 1, wherein the ingress LSR sends subsequent MPLS echo request packets for testing connectivity of the LSP, wherein the subsequent MPLS echo request packets include a modified FEC stack in accordance with the information included in the MPLS echo reply packet received from the intermediate LSR.

17. The system of claim 2, wherein the MPLS echo reply packet includes information that specifies a position indicator that indicates a position within the FEC stack specified within the subsequent MPLS echo request packets at which to place the FEC that identifies the second LSP.

18. The system of claim 1, wherein the information that instructs the LSR to modify the FEC stack comprises a FEC specified within a TLV sub-field of the MPLS echo reply.

19. The system of claim 1, wherein the FEC identifying the first LSP comprises a single element that captures one of an Internet Protocol (IP) prefix, a Virtual Private Network (VPN) IP prefix, a Label Distribution Protocol (LDP) prefix sub-TLV, a CR-LDP LSP identifier, a L2 VPN endpoint, a FEC pseudowire, and a Resource Reservation Protocol (RSVP) IP session.

20. The method of claim 14, wherein the LSP comprises a first LSP that is tunneled through at least a second LSP, wherein the intermediate LSR operates as an ingress LSR of the second LSP through which a portion of the first LSP is tunneled, and wherein the MPLS echo reply packet includes information that specifies a FEC that identifies the second LSP and instructs the ingress LSR of the first LSP to add to the FEC stack of the subsequent MPLS echo request the FEC that identifies the second LSP.

21. The method of claim 14, wherein the LSP comprises a first LSP that is stitched to at least a second LSP, and wherein the MPLS echo reply packet includes information that specifies a FEC that identifies the second LSP and instructs the ingress LSR of the first LSP to change the FEC in the FEC stack specified within the subsequent MPLS echo request packets that identifies the first LSP to the FEC that identifies the second LSP.

22. The method of claim 14, wherein the LSP comprises an end-to-end inter-autonomous system LSP composed of a first LSP within a first autonomous system stitched to a second LSP within a second autonomous system.

23. The method of claim 14, wherein testing connectivity of the LSP comprises testing connectivity of an end-to-end inter-autonomous system label switched path (LSP), wherein the end-to-end inter-autonomous system LSP includes a first LSP within a first autonomous system and a second LSP within a second autonomous system, wherein the first LSP and the second LSP are stitched together to form the end-to-end inter-autonomous system LSP.

* * * * *